US006954314B2

(12) United States Patent
Nomura et al.

(10) Patent No.: US 6,954,314 B2
(45) Date of Patent: Oct. 11, 2005

(54) CAM MECHANISM OF A LENS BARREL

(75) Inventors: Hiroshi Nomura, Saitama (JP); Yoshihiro Yamazaki, Saitama (JP); Isao Okuda, Saitama (JP)

(73) Assignee: PENTAX Corporation, Tokyo (JP)

( * ) Notice: Subject to any disclaimer, the term of this patent is extended or adjusted under 35 U.S.C. 154(b) by 54 days.

(21) Appl. No.: 10/769,925

(22) Filed: Feb. 3, 2004

(65) Prior Publication Data

US 2004/0156127 A1 Aug. 12, 2004

(30) Foreign Application Priority Data

Feb. 4, 2003 (JP) ....................................... 2003-027341
Feb. 4, 2003 (JP) ....................................... 2003-027342

(51) Int. Cl.[7] ................................................ G02B 15/14
(52) U.S. Cl. ........................................ 359/700; 359/701
(58) Field of Search ......................... 359/694, 699–701, 359/823

(56) References Cited

U.S. PATENT DOCUMENTS

| | | | | |
|---|---|---|---|---|
| 5,790,902 A | | 8/1998 | Mizouchi et al. | |
| 5,818,647 A | | 10/1998 | Nishio et al. | |
| 6,035,136 A | | 3/2000 | Hayashi et al. | |
| 6,069,745 A | | 5/2000 | Fujii et al. | |
| 6,072,643 A | | 6/2000 | Nishio et al. | |
| 6,278,843 B1 | * | 8/2001 | Iwasaki et al. | 396/72 |
| 6,369,962 B1 | | 4/2002 | Nomura et al. | |
| 6,456,445 B2 | * | 9/2002 | Nomura et al. | 359/699 |
| 2003/0179467 A1 | * | 9/2003 | Todani | 359/699 |
| 2004/0042777 A1 | | 3/2004 | Nomura | |
| 2004/0048089 A1 | | 3/2004 | Nomura | |
| 2004/0051971 A1 | | 3/2004 | Nomura | |

FOREIGN PATENT DOCUMENTS

| | | |
|---|---|---|
| JP | 2562760 | 10/1997 |
| JP | 10282394 | 10/1998 |
| JP | 11218666 | 8/1999 |
| JP | 2001-124972 | 5/2001 |
| JP | 3379721 | 2/2003 |

* cited by examiner

*Primary Examiner*—Ricky Mack
(74) *Attorney, Agent, or Firm*—Greenblum & Bernstein, P.L.C.

(57) ABSTRACT

A cam mechanism of a lens barrel includes first and second ring members; cam grooves having similar cam diagrams formed on one of the first and second ring members, and cam followers formed on the other thereof. Two groove/follower groups positioned at different positions in a circumferential direction. The cam grooves of one of the two groove/follower groups intersect cam grooves of another of the two groove/follower groups, respectively. One of the following is satisfied: (a) a distance in the optical-axis direction between front and rear groove/follower sets of one of the two groove/follower groups is different from that between the front and rear groove/follower sets of another of the two groove/follower groups, and (b) a distance in the circumferential direction between two front groove/follower sets of the two groove/follower groups is different from that between two the rear groove/follower sets of the two groove/follower groups.

17 Claims, 24 Drawing Sheets

$\alpha = \beta$ and A=B

CAM MECHANISM OF A LENS BARREL

BACKGROUND OF THE INVENTION

1. Field of the Invention

The present invention relates to a cam mechanism of a lens barrel which includes a first ring member (e.g., a cam ring) and a second ring member (e.g., a lens frame) supporting a part of a lens system, wherein the first ring member is rotated to move the second ring member linearly along the optical axis of the lens system.

2. Description of the Related Art

In conventional zoom lenses (zoom lens barrels), it is often the case that a lens support ring which supports a part of a zoom lens system is linearly moved along the optical axis thereof by rotation of a cam ring which is driven to rotate. The cam ring includes a plurality of cam grooves which are formed on a peripheral surface of the cam ring to have the same reference cam diagrams, while the lens support ring that is linearly guided along the optical axis includes a corresponding plurality of cam followers which are engaged in the plurality of cam grooves of the cam ring, respectively. The plurality of cam grooves, which have the same reference cam diagrams, and the plurality of cam followers are generally arranged at equi-angular intervals of 120 degrees.

However, a substantial reduction in diameter of the cam ring of a zoom lens in order to miniaturize the cam ring causes adjacent cam grooves of the cam ring to be formed so as to intersect each other on the cam ring, which may cause each cam follower to come off the associated cam groove if the plurality of cam grooves and the plurality of cam followers are simply arranged at equi-angular intervals of 120 degrees.

In addition, there is a sufficient possibility of the relationship between the plurality of cam grooves and the plurality of cam followers being applied to a moving mechanism for moving a focusing lens group or any other optical element, not only to a power-varying lens-group of a zoom lens optical system.

SUMMARY OF THE INVENTION

The present invention provides a cam mechanism of a lens barrel which includes a first ring member and a second ring member supporting a part of a lens system, wherein the first ring member is rotated to move the second ring member linearly along the optical axis of the lens system, and wherein there is no possibility of a plurality of cam followers which are formed on one of the first ring member and the second ring member coming off a corresponding plurality of cam grooves, having the same reference cam diagrams which are formed on the other of the first ring member and the second ring member, even if adjacent cam grooves of the cam ring are formed to intersect each other.

According to an aspect of the present invention, a cam mechanism of a lens barrel is provided, including a first ring member driven to rotate about an optical axis; a second ring member which supports an optical element, and is linearly guided along the optical axis without rotating; a plurality of cam grooves having the same cam diagrams which are formed on one of the first ring member and the second ring member; and a plurality of cam followers formed on the other of the first ring member and the second ring member to be engaged in the plurality of cam grooves, respectively. At least two groove/follower groups, each of which includes a front groove/follower set and a rear groove/follower set which are positioned at different positions in the optical axis direction, are positioned at different positions in a circumferential direction, each of the front groove/follower set and the rear groove/follower set including a cam groove of the plurality of cam grooves and an associated cam follower of the plurality of cam followers. The cam grooves of one of the two groove/follower groups intersect the cam grooves of another of the two groove/follower groups, respectively. At least one of the following two conditions (a) and (b) is satisfied: (a) a distance in the optical axis direction between the front groove/follower set and the rear groove/follower set of one of the two groove/follower groups is different from a distance in the optical axis between the front groove/follower set and the rear groove/follower set of another of the two groove/follower groups, and (b) a distance in the circumferential direction between two the front groove/follower sets of the two groove/follower groups is different from a distance in the circumferential direction between two the rear groove/follower sets of the two groove/follower groups. The term “groove/follower set (front groove/follower set or rear groove/follower set) means that the plurality of cam grooves are in a one-to-one correspondence with the plurality of cam followers, which are engaged in the plurality of cam grooves, respectively, and further means that the width and the depth of a cam groove correspond to the width and the depth of an associated cam follower, respectively. Accordingly, a discussion of the position and the contours of each cam groove (or each cam follower) logically corresponds a discussion of the position and the contours of the associated cam follower (or the associated cam groove).

According to this cam mechanism, each cam follower can be prevented from coming off the associated cam groove regardless of how each cam groove intersects another cam groove(s).

The present invention can be embodied in theory if only there are two groove/follower groups at different positions in a circumferential direction; however, it is desirable that there are at least three groove/follower groups at different positions in a circumferential direction to hold the optical element (e.g., a lens group). According to this structure, the cam grooves (front and rear cam grooves) of one groove/follower group can be made to intersect the cam grooves (front and rear cam grooves) of another groove/follower group, respectively.

A. It is desirable for least one of the following two conditions (c) and (d) to be satisfied: (c) the front groove/follower sets of the three groove/follower groups are positioned at irregular intervals in the circumferential direction, and (d) the rear groove/follower sets of the three groove/follower groups are positioned at irregular intervals in the circumferential direction.

B. It is desirable for a distance in the optical axis direction between the front groove/follower set and the rear groove/follower set of one of the three groove/follower groups is different from a distance in the optical axis direction between the front groove/follower set and the rear groove/follower set of another of the three groove/follower groups.

C. It is desirable for the cam groove of the front groove/follower set and the cam groove of the rear groove/follower set to be different in at least one of width and depth for at least one of the three groove/follower groups.

D. It is desirable for the width relationship between the cam groove of the front groove/follower set and the cam groove of the rear groove/follower set of one of the three groove/follower groups to be different from that between the cam groove of the front groove/follower set and the cam groove of the rear groove/follower set of another of the three groove/follower groups.

It is desirable for two cam grooves of the plurality of cam grooves which are adjacent in the circumferential direction to be different in at least one of width and depth.

The number of the plurality of cam grooves is determined according to the diameter of the lens barrel, the contours of the cam grooves and other factors. In a particular lens barrel which has been developed in a company of the applicant of the present invention, it has been proved that the most practical number of the groove/follower sets (i.e., the sum of the number of the front groove/follower sets and the number of the rear groove/follower sets) is six (namely, the three groove/follower groups are arranged at different positions in the circumferential direction).

The optical element can be not only a lens group such as a power-varying lens group or a focusing lens group but also any other optical element such as an image pick-up device.

The lens system can be a zoom lens optical system.

It is desirable for the first ring member to be fitted on the second ring member to be positioned coaxial with the second ring member.

It is desirable for the plurality of cam grooves to be formed on an inner peripheral surface of the first ring member, and the plurality of cam followers to be formed on an outer peripheral surface of the second ring member.

It is desirable for the first ring member to include another plurality of cam grooves formed on an outer peripheral surface of the first ring member.

It is desirable for the first ring member to include a spur gear which is formed on an outer peripheral surface of the first ring member in the vicinity of the rear end thereof to be engaged with a drive pinion.

It is desirable for teeth of the spur gear to be formed on the thread of a male helicoid formed on the outer peripheral surface of the first ring member.

It is desirable for the lens barrel to include a stationary barrel having a female helicoid formed on an inner peripheral surface of the stationary barrel. The male helicoid of the first ring member is engaged with the female helicoid of the stationary barrel.

It is desirable for the first ring member to rotate while moving along the optical axis when driven to rotate.

The present disclosure relates to subject matter contained in Japanese Patent Application Nos. 2003-027341 and 2003-027342 (both filed on Feb. 4, 2003) which are expressly incorporated herein by reference in their entireties.

BRIEF DESCRIPTION OF THE DRAWINGS

The present invention will be described below in detail with reference to the accompanying drawings in which.

DESCRIPTION OF THE PREFERRED EMBODIMENTS

Figure 1:
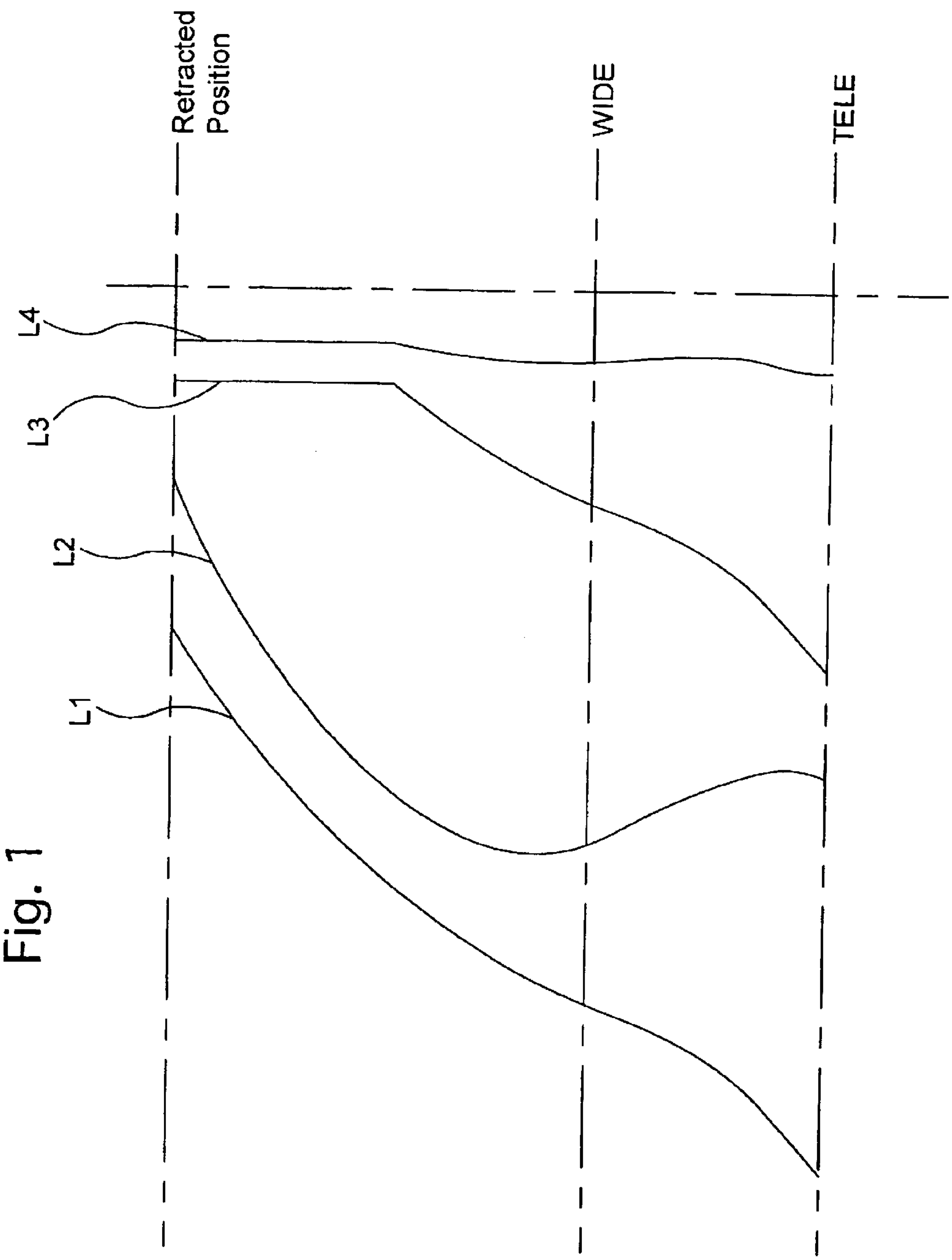
FIG. 1 is a diagram showing reference moving paths of zoom lens groups of a zoom lens system provided in an embodiment of a zoom lens barrel according to the present invention.
Figure 2:
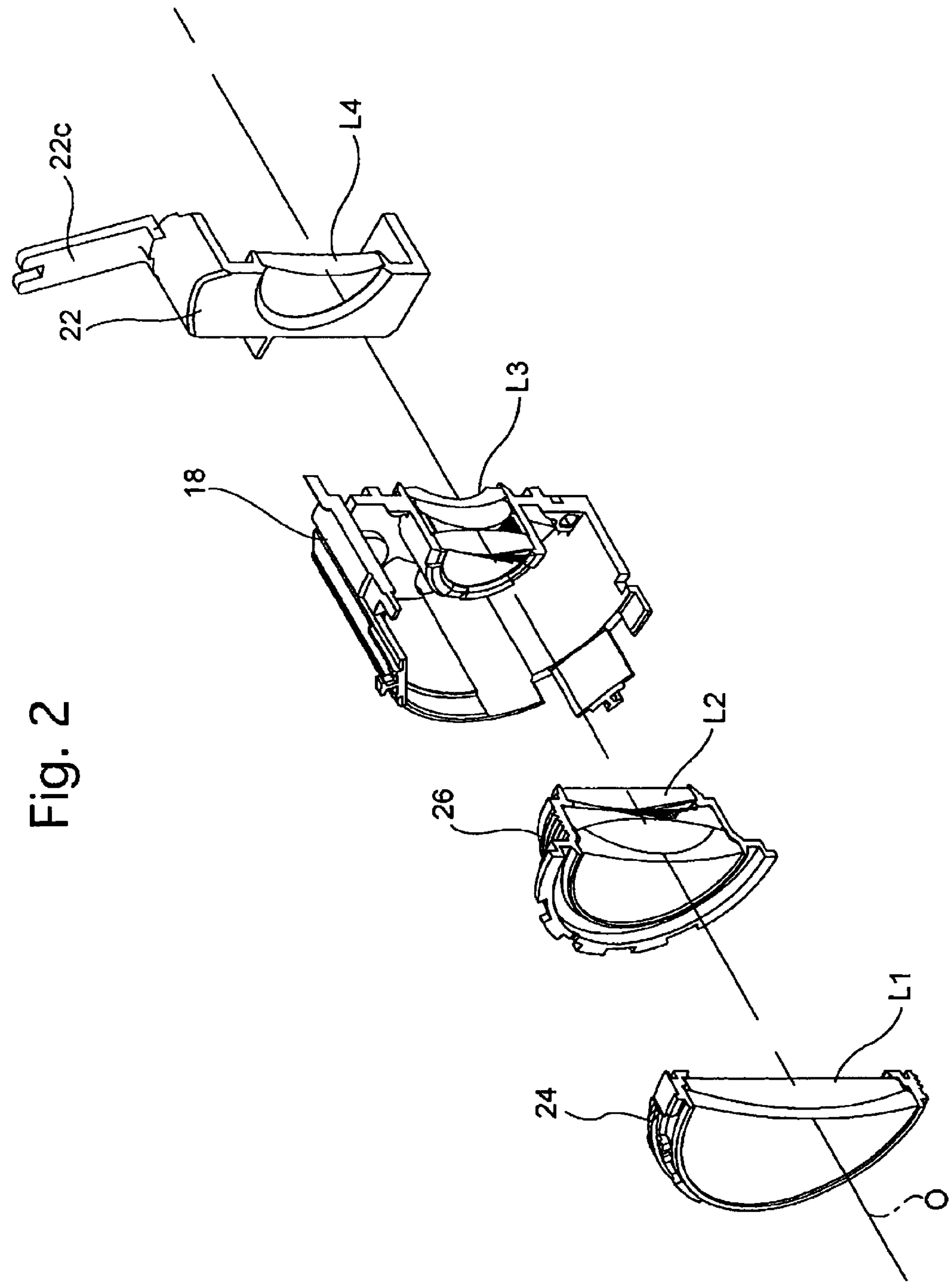
FIG. 2 is an exploded perspective view in axial section of the zoom lens groups and lens support frames therefor.

First of all, a zoom lens system (zoom lens optical system) provided in an embodiment of a zoom lens barrel of a camera according to the present invention will be hereinafter discussed with reference to FIGS. 1 through 5. The zoom lens system of the zoom lens barrel 10 is a vari-focal lens system consisting of four lens groups: a positive first lens group L1, a negative second lens group L2, a positive third lens group L3 and a positive fourth lens group L4, in that order from the object side (left side as viewed in FIG. 3). The first through third lens groups L1, L2 and L3 are moved relative to one another along an optical axis O to vary the focal length of the zoom lens system and the fourth lens group L4 is moved along the optical axis O to make a slight focus adjustment, i.e., to adjust a slight focus deviation caused by the variation of the focal length. During the operation of varying the focal length of the zoom lens system between wide angle and telephoto, the first lens group L1 and the third lens group L3 move along the optical axis while maintaining the distance therebetween. The fourth lens group L4 also serves as a focusing lens group. FIG. 1 shows both moving paths of the first through fourth lens groups L1 through L4 during the zooming operation and moving paths for advancing/retracting operation. By definition, a vari-focal lens is one whose focal point slightly varies when varying the focal length, and a zoom lens is one whose focal point does not vary substantially when varying the focal length. However, the vari-focal lens system of the present invention is also hereinafter referred to as a zoom lens system.

Figure 8:
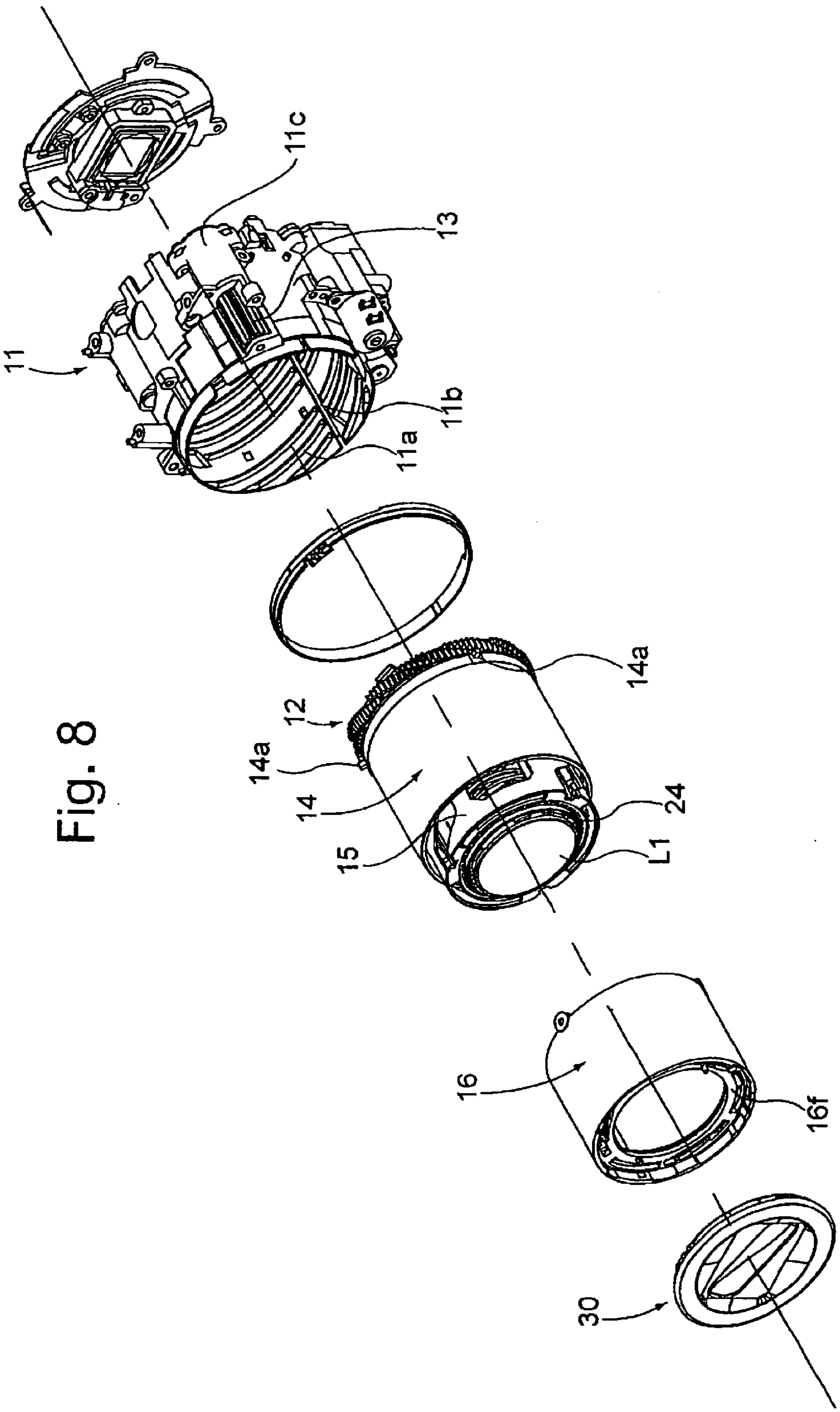
FIG. 8 is an exploded perspective view of a portion of the zoom lens barrel shown in FIG. 3.
Figure 9:
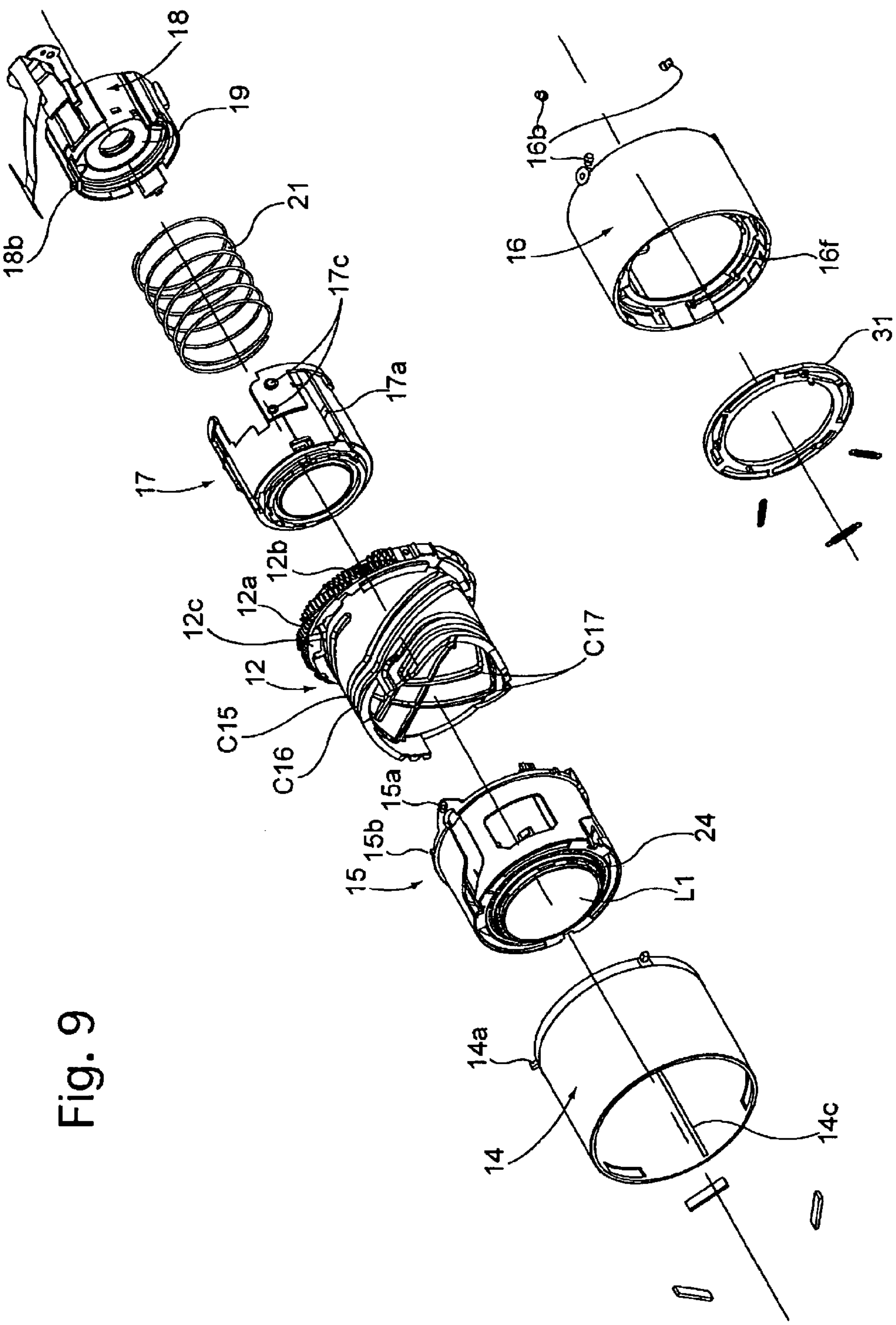
FIG. 9 is an exploded perspective view of a portion of the zoom lens barrel shown in FIG. 3.
Figure 10:
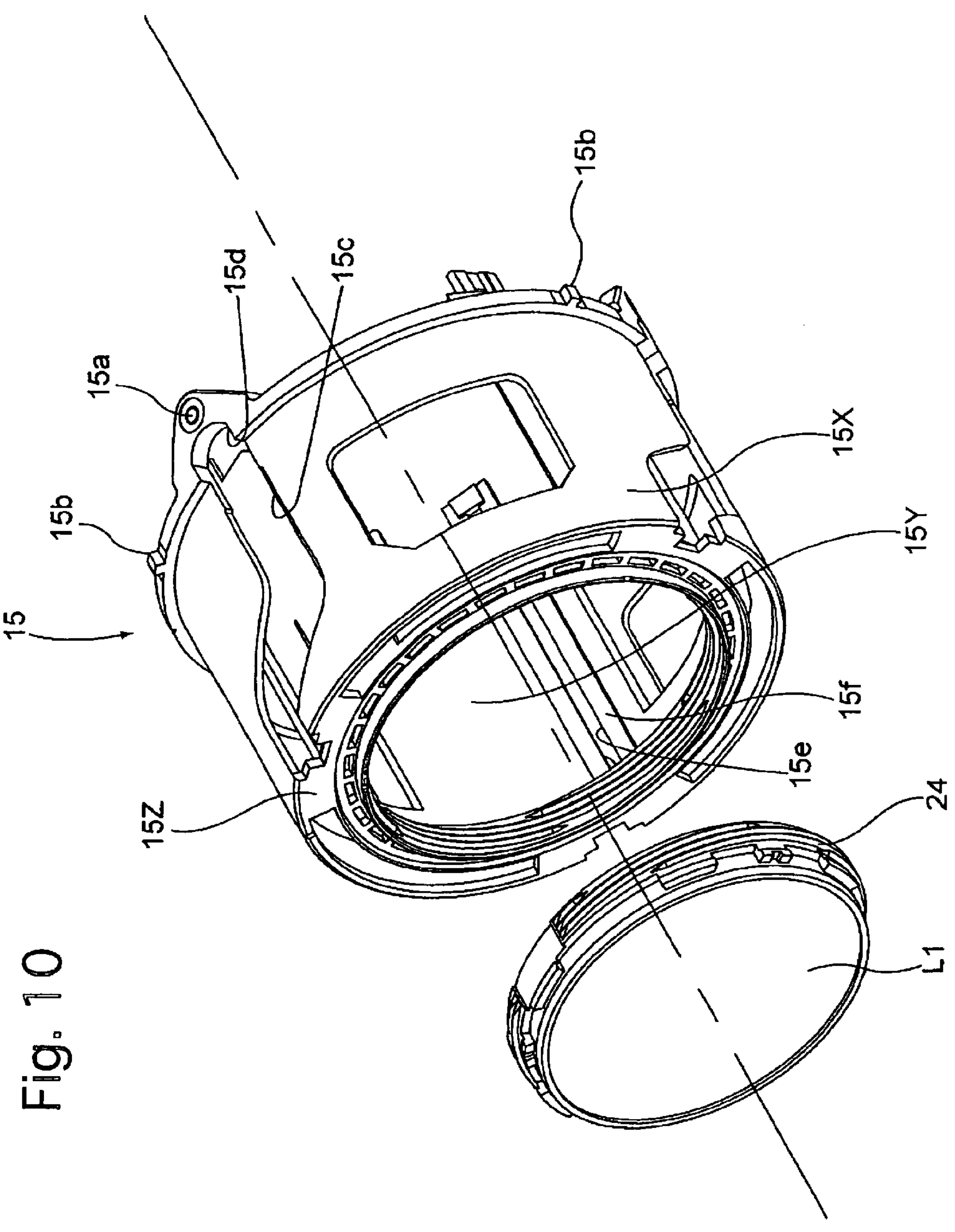
FIG. 10 is an exploded perspective view of a portion of the zoom lens barrel shown in FIG. 3, showing a first lens group moving ring and peripheral elements.
Figure 15:
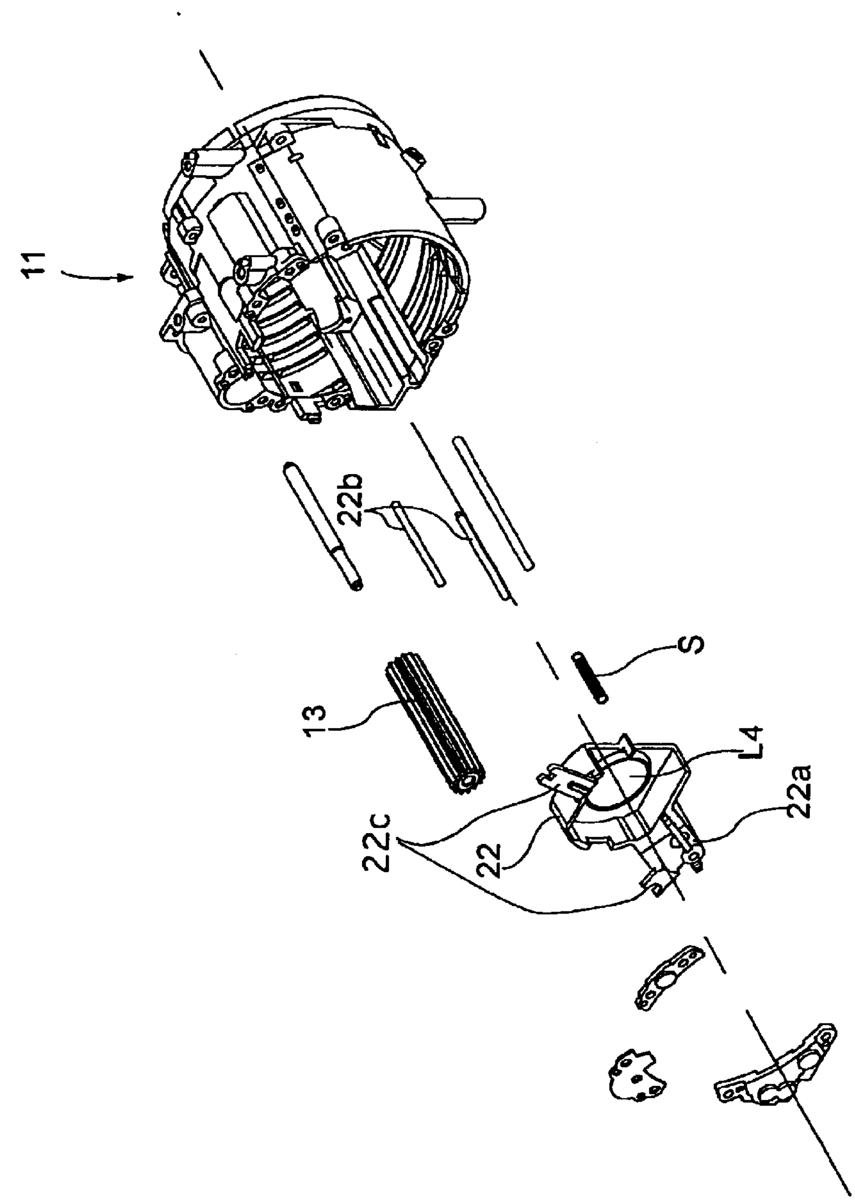
FIG. 15 is an exploded perspective view of a portion of the zoom lens barrel shown in FIG. 3, showing the stationary barrel, a fourth lens group and peripheral elements.

The overall structure of the zoom lens barrel 10 will be hereinafter discussed with reference to FIGS. 1 through 19. The zoom lens barrel 10 is provided with a stationary barrel 11 which is fixed to a camera body (not shown). As shown in FIG. 8, the stationary barrel 11 is provided on an inner peripheral surface thereof with a female helicoid 11*a* and a set of three linear guide grooves 11*b* which extend parallel to the optical axis O. The zoom lens barrel 10 is provided inside the stationary barrel 11 with a cam/helicoid ring (cam ring) 12. As shown in FIG. 9, the cam/helicoid ring 12 is provided, on an outer peripheral surface thereof in the vicinity of the rear end of the cam/helicoid ring 12, with a male helicoid 12*a* which is engaged with the female helicoid 11*a* of the stationary barrel 11. The cam/helicoid ring 12 is provided on the thread of the male helicoid 12*a* with a spur gear 12*b* which is always engaged with a drive pinion 13 (see FIG. 15). The drive pinion 13 is provided in a recessed portion 11*c* (see FIG. 3) formed on an inner peripheral surface of the stationary barrel 11. The drive pinion 13 is supported by the stationary barrel 11 to be freely rotatable in the recessed portion 11*c* on an axis of the drive pinion 13. Accordingly, forward and reverse rotations of the drive pinion 13 cause the cam/helicoid ring 12 to move forward rearward along the optical axis O while rotating about the optical axis O due to the engagement of the drive pinion 13 with the spur gear 12*b* and the engagement of the female helicoid 11*a* with the male helicoid 12*a*. In the present embodiment of the zoom lens barrel 10, the cam/helicoid ring 12 is the only element thereof which rotates about the optical axis O.

The zoom lens barrel 10 is provided around the cam/helicoid ring 12 with a linear guide ring 14. The linear guide ring 14 is provided, on an outer peripheral surface thereof at the rear end of the linear guide ring 14, with a set of three linear guide projections 14*a* which project radially outwards to be engaged in the set of three linear guide grooves 11*b* of the stationary barrel 11, respectively. The linear guide ring 14 is provided, on an inner peripheral surface thereof at the rear end of the linear guide ring 14, with a set of three bayonet lugs 14*b* (only one of them appears in FIGS. 1 through 4). The cam/helicoid ring 12 is provided, on an outer peripheral surface thereof immediately in front of the male helicoid 12*a* (the spur gear 12*b*), with a circumferential groove 12*c* in which the set of three bayonet lugs 14*b* are engaged to be rotatable about the optical axis O in the circumferential groove 12*c*. Accordingly, the linear guide ring 14 is linearly movable along the optical axis O together with the cam/helicoid ring 12 without rotating about the optical axis O.

Figure 4:
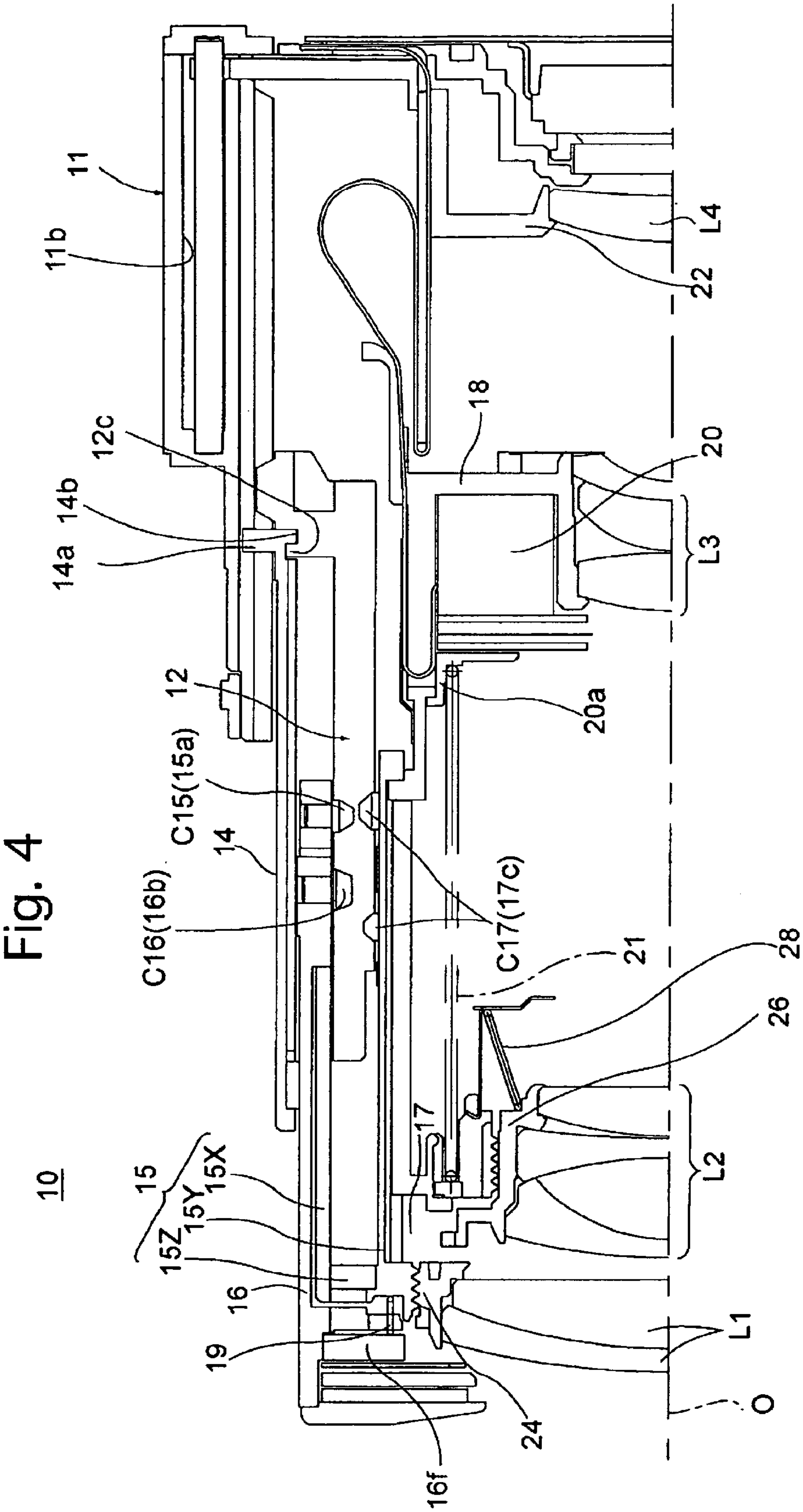
FIG. 4 is a view similar to that of FIG. 3, and shows an upper half of the zoom lens barrel from the optical axis thereof at the wide-angle extremity.
Figure 16:
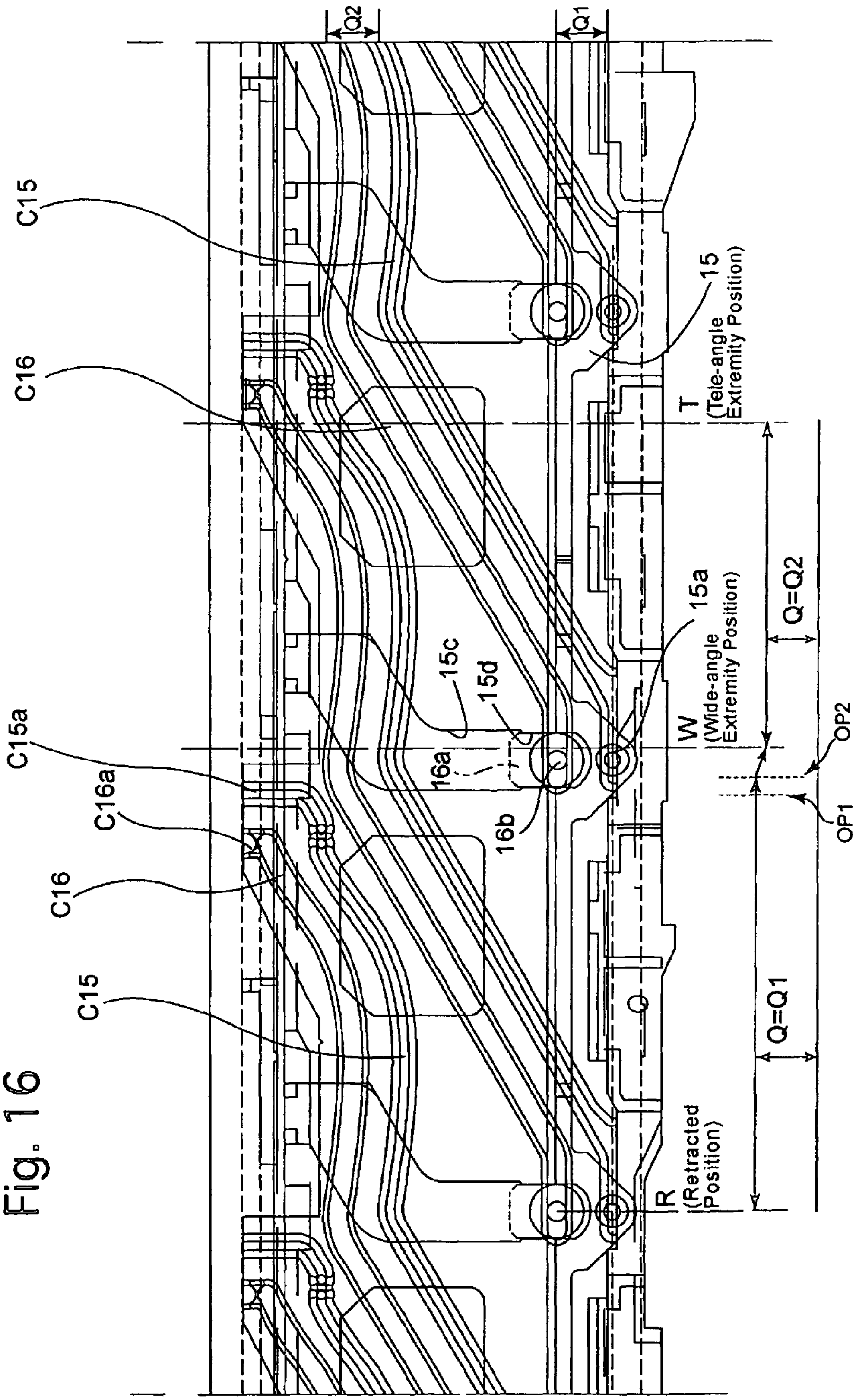
FIG. 16 is a developed view of a cam/helicoid ring, showing first cam grooves of the cam/helicoid ring for moving the first lens group and third cam grooves of the cam/helicoid ring for moving an exterior ring.

The zoom lens barrel 10 is provided around the cam/helicoid ring 12 with a first lens group moving ring (first lens frame) 15 which supports the first lens group L1, and is further provided around the first lens group moving ring 15 with an exterior ring 16 serving as a light shield member. The zoom lens barrel 10 is provided inside the cam/helicoid ring 12 with a second lens group moving ring (second lens frame) 17 which supports the second lens group L2. As shown in FIGS. 4, 9 and 16, the cam/helicoid ring 12 is provided on an outer peripheral surface thereof with a set of three first cam grooves C15 for moving the first lens group moving ring 15 and a set of three third cam grooves C16 for moving the exterior ring 16, and is further provided on an inner peripheral surface of the cam/helicoid ring 12 with a set of six second cam grooves C17 for moving the second lens group moving ring 17 (see FIG. 19). The set of three first cam grooves C15 and the set of three third cam grooves C16 are slightly different in shape, and are apart from one another at predetermined intervals in a circumferential direction of the cam/helicoid ring 12. The set of six second cam grooves C17 have the same basic cam diagrams, and includes three front second cam grooves C17, and three rear second cam grooves C17 which are positioned behind the three front second cam grooves C17 in the optical-axis direction (vertical direction as viewed in FIG. 19), respectively; the three front second cam grooves C17 are apart from one another in a circumferential direction of the cam/helicoid ring 12 while the three rear second cam grooves C17 are apart from one another in a circumferential direction of the cam/helicoid ring 12. Each of the first lens group moving ring 15, the exterior ring 16 and the second lens group moving ring 17 is linearly guided along the optical axis O. A rotation of the cam/helicoid ring 12 causes the first lens group moving ring 15, the exterior ring 16 and the second lens group moving ring 17 to move along the optical axis O in accordance with the contours of the set of three first cam grooves C15, the set of three third cam grooves C16 and the set of six second cam grooves C17, respectively.

Figure 5:
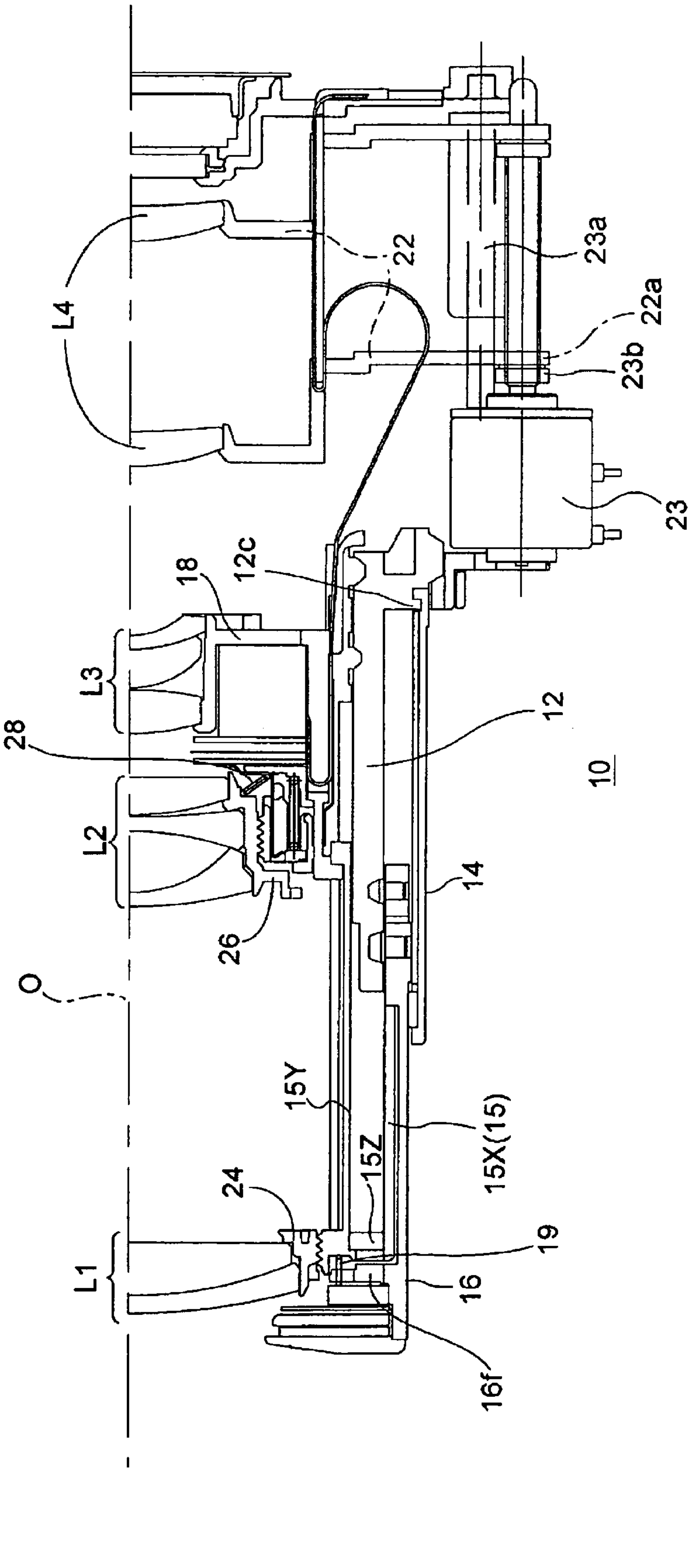
FIG. 5 is a view similar to that of FIG. 3, and shows a lower half of the zoom lens barrel from the optical axis thereof at the telephoto extremity.

Linear guide mechanical linkages among the first lens group moving ring 15, the exterior ring 16 and the second lens group moving ring 17 will be discussed hereinafter. As shown in FIGS. 4 and 5, the first lens group moving ring 15 is provided with an outer ring portion 15X, an inner ring portion 15Y and a flange wall 15Z by which the front end of the outer ring portion 15X and the front end of the inner ring portion 15Y are connected to have a substantially U-shaped cross section. The cam/helicoid ring 12 is positioned between the outer ring portion 15X and the inner ring portion 15Y. Three cam followers 15*a* which are respectively engaged in the set of three first cam grooves C15 are fixed to the outer ring portion 15X in the vicinity of the rear end thereof. The zoom lens barrel 10 is provided with a first lens group support frame 24 which supports the first lens group L1. As shown in FIGS. 8 and 9, the first lens group support frame 24 is fixed to the inner ring portion 15Y at the front end thereof through a male thread portion and a female thread portion which are formed on an outer peripheral surface of the first lens group support frame 24 and an inner peripheral surface of the inner ring portion 15Y, respectively (see FIG. 10). The first lens group support frame 24 can be rotated relative to the first lens group moving ring 15 to adjust the position of the first lens group support frame 24 along the optical axis O relative to the first lens group moving ring 15 to carry out a zooming adjustment (which is an adjustment operation which is carried out in a manufacturing process of the zoom lens barrel if necessary).

The linear guide ring 14, which is linearly guided along the optical axis O by the stationary barrel 11, is provided, on an inner peripheral surface thereof at approximately equi-angular intervals (intervals of approximately 120 degrees), with a set of three linear guide grooves 14*c* (only one of them appears in FIG. 9), while the outer ring portion 15X of the first lens group moving ring 15 is provided at the rear end thereof with a set of three linear guide projections 15*b* (see FIG. 10) which project radially outwards to be engaged in the set of three linear guide grooves 14*c*, respectively. The outer ring portion 15X is provided with a set of three assembly slots 15*c* (see FIGS. 10 and 16), and is further provided at the rear ends of the set of three assembly slots 15*c* with a set of linear guide slots 15*d* which are communicatively connected with the set of three assembly slots 15*c* and are smaller in width than the set of three assembly slots 15*c*, respectively. Three linear guide keys 16*a* which are fixed to the exterior ring 16 which is positioned between the outer ring portion 15X and the linear guide ring 14 are engaged in the set of linear guide slots 15*d*, respectively. The maximum relative moving distance between the first lens group moving ring 15 and the exterior ring 16 along the optical axis O (the difference in shape between the set of three first cam grooves C15 and the set of three third cam grooves C16) is only a slight distance, and the length of each linear guide slot 15*d* in the optical-axis direction is correspondingly short. A set of three cam followers 16*b* which are engaged in the set of three third cam grooves C16 are fixed to the set of three linear guide keys 16*a*, respectively (see FIGS. 7 and 9).

Figure 3:
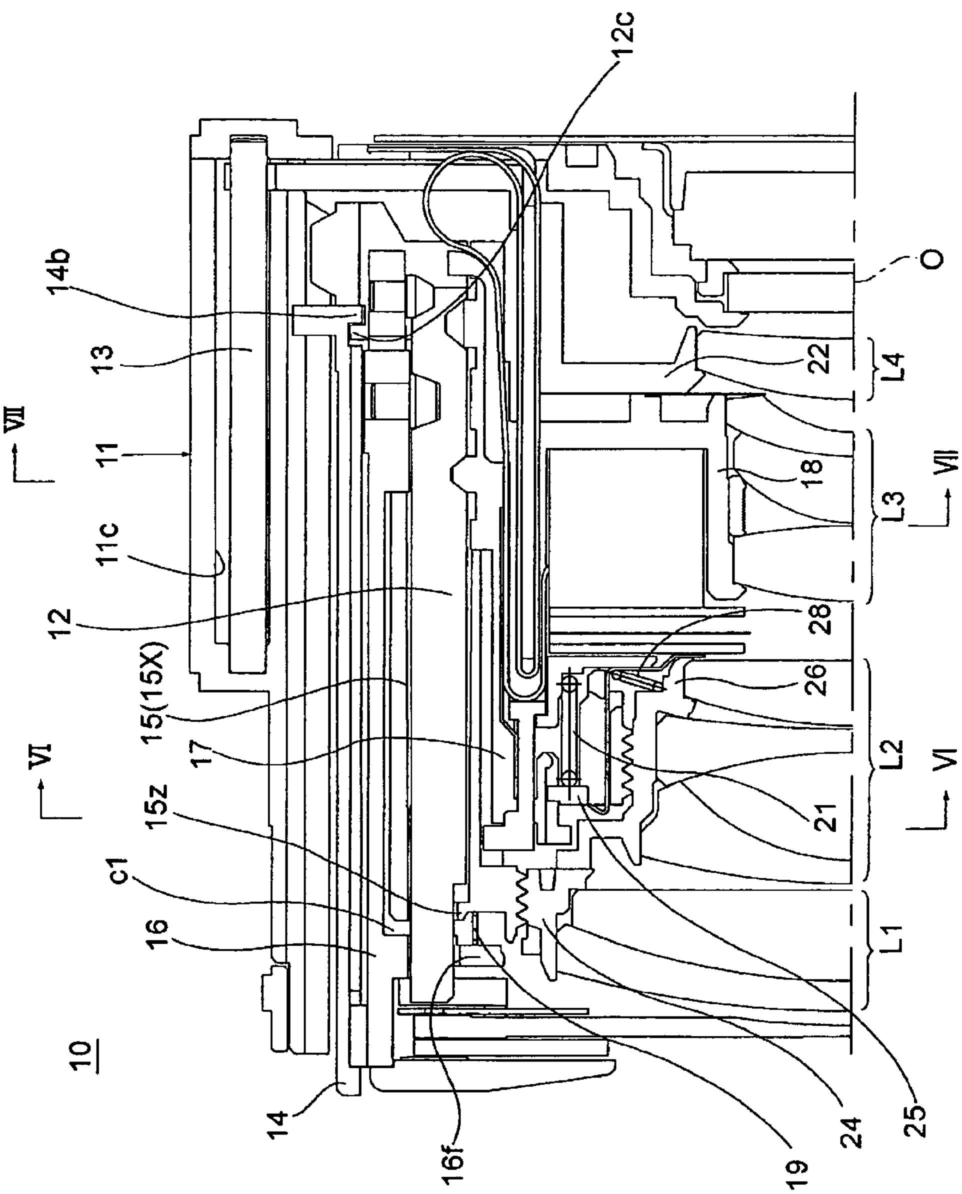
FIG. 3 is a longitudinal cross sectional view of the embodiment of the zoom lens barrel according to the present invention, showing an upper half of the zoom lens barrel from the optical axis thereof in a retracted state.

The zoom lens barrel 10 is provided between the first lens group moving ring 15 and the exterior ring 16 with a compression coil spring 19 (see FIGS. 3 through 5). The compression coil spring 19 biases the first lens group moving ring 15 rearward to remove backlash between the set of three first cam grooves C15 and the set of three cam followers 15*a*, and at the same time, biases the exterior ring 16 forward to remove backlash between the set of three third cam grooves C16 and the set of three cam followers 16*b*.

As shown in FIG. 16, the set of three first cam grooves C15 and the set of three third cam grooves C16 are shaped slightly different from each other in their respective retracting ranges, as compared with their respective photographing ranges (zooming ranges), so that the exterior ring 16 advances from the photographing position thereof relative to the first lens group moving ring 15 to prevent barrier blades of a lens barrier unit 30 (see FIG. 8) and the first lens group L1 from interfering with each other when the zoom lens barrel 10 is fully retracted as shown in FIG. 3. More specifically, as shown in FIG. 16, the shapes of the first cam grooves C15 and the third cam grooves C16 are determined so that the distance Q in the optical axis direction between the first cam grooves C15 and the third cam grooves C16 in the preparation ranges (i.e., the range between the retracted position and the position at which the lens barrier unit 30 is fully open) is longer than that of the zoom ranges (i.e., the range between the wide-angle extremity and the telephoto extremity). Namely, throughout the entirety of the preparation ranges the distance Q=Q1, however, the distance Q gradually reduces from a position OP2 at a predetermined distance from a fully opened position OP1 of the lens barrier unit 30 (i.e., from a position whereby the first lens group L1 and the lens barrier unit 30 do not interfere with each other), so that the distance Q=Q2 (<Q1) at the wide-angle extremity, and the distance Q=Q2 in the entirety of the zoom ranges. It can be seen that a clearance c1 (see FIG. 3) between the flange wall 15Z of the first lens group moving ring 15 and a flange wall 16*f* of the exterior ring 16 when the zoom lens barrel 10 is in the retracted position as shown in FIG. 3 is greater than that when the zoom lens barrel 10 is in a ready-to-photograph position as shown in FIG. 4 or 5. In other words, when the zoom lens barrel 10 is in a ready-to-photograph position as shown in FIG. 4 or 5, the flange wall 15Z of the first lens group moving ring 15 and the flange wall 16*f* of the exterior ring 16 are positioned closely to each other to prevent vignetting which may be caused by the barrier unit 30 from occurring. The lens barrier unit 30 is supported by the exterior ring 16 at the front end thereof. The zoom lens barrel 10 is provided, immediately behind the lens barrel unit 30 between the lens barrier unit 30 and the flange wall 16*f* of the exterior ring 16, with a barrier opening/closing ring 31 (see FIG. 9). Rotating the barrier opening/closing ring 31 by rotation of the cam/helicoid ring 12 causes the barrier blades of the lens barrier unit 30 to open and shut. The mechanism for opening and closing the barrier blades using a barrier opening/closing ring such as the barrier opening/closing ring 31 is known in the art. Note that in the illustrated embodiment, although the shapes of the first cam grooves C15 and the third cam grooves C16 are determined so that the distance Q (i.e., Q2) is constant (unchanging) over the entire zoom range, the distance Q (i.e., Q2) can be determined so as to change in accordance with the focal length. Furthermore, the distance Q2 over the zoom range can be determined so as to be greater than the distance Q1 over the preparation range.

The front end of each third cam groove C16 is open on a front end surface of the cam/helicoid ring 12 to be formed as an open end C16*a* (see FIG. 16) through which the associated cam follower 16*b* of the exterior ring 16 is inserted into the third cam groove C16. Likewise, the front end of each first cam groove C15 is open on a front end surface of the cam/helicoid ring 12 to be formed as an open end C15*a* (see FIG. 16) through which the associated cam follower 15*a* of the first lens group moving ring 15 is inserted into the first cam groove C15.

Figure 6:
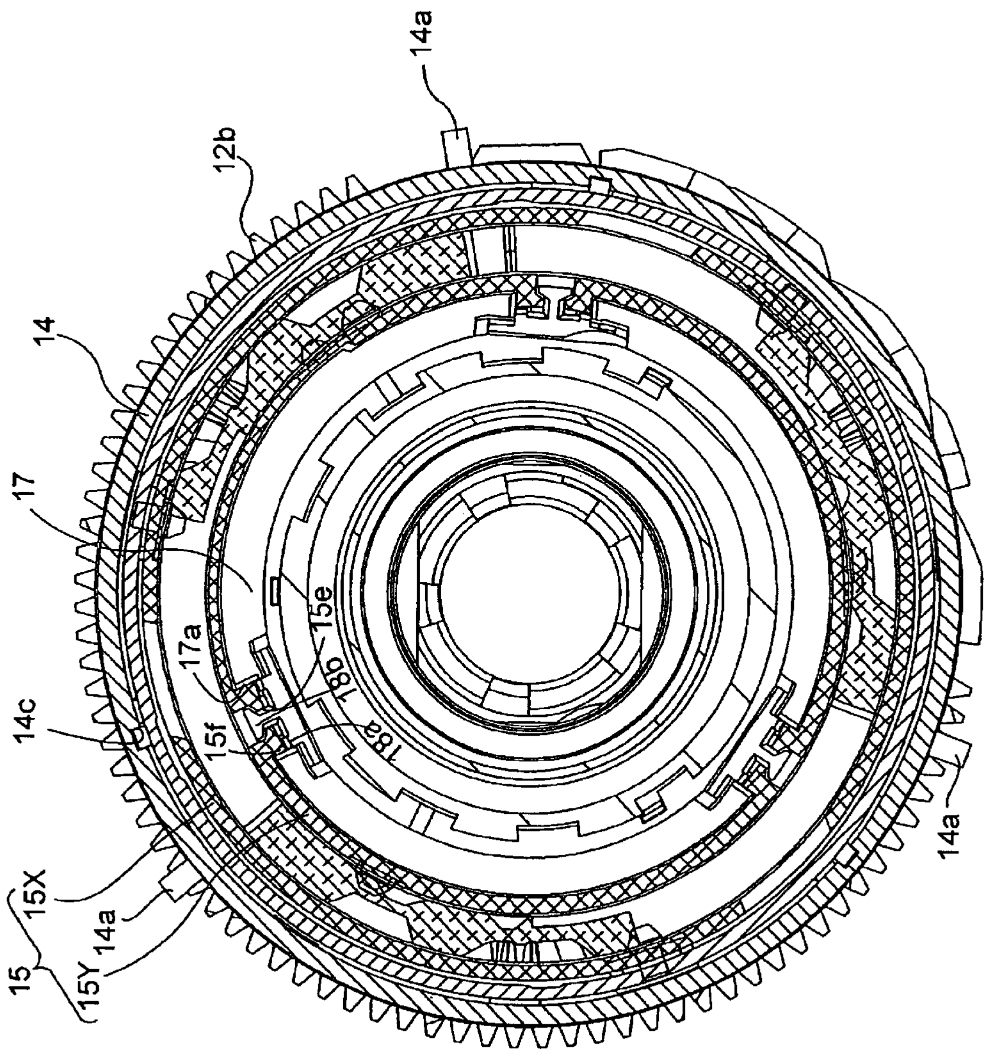
FIG. 6 is a transverse cross sectional view taken along VI—VI line shown in FIG. 3.
Figure 7:
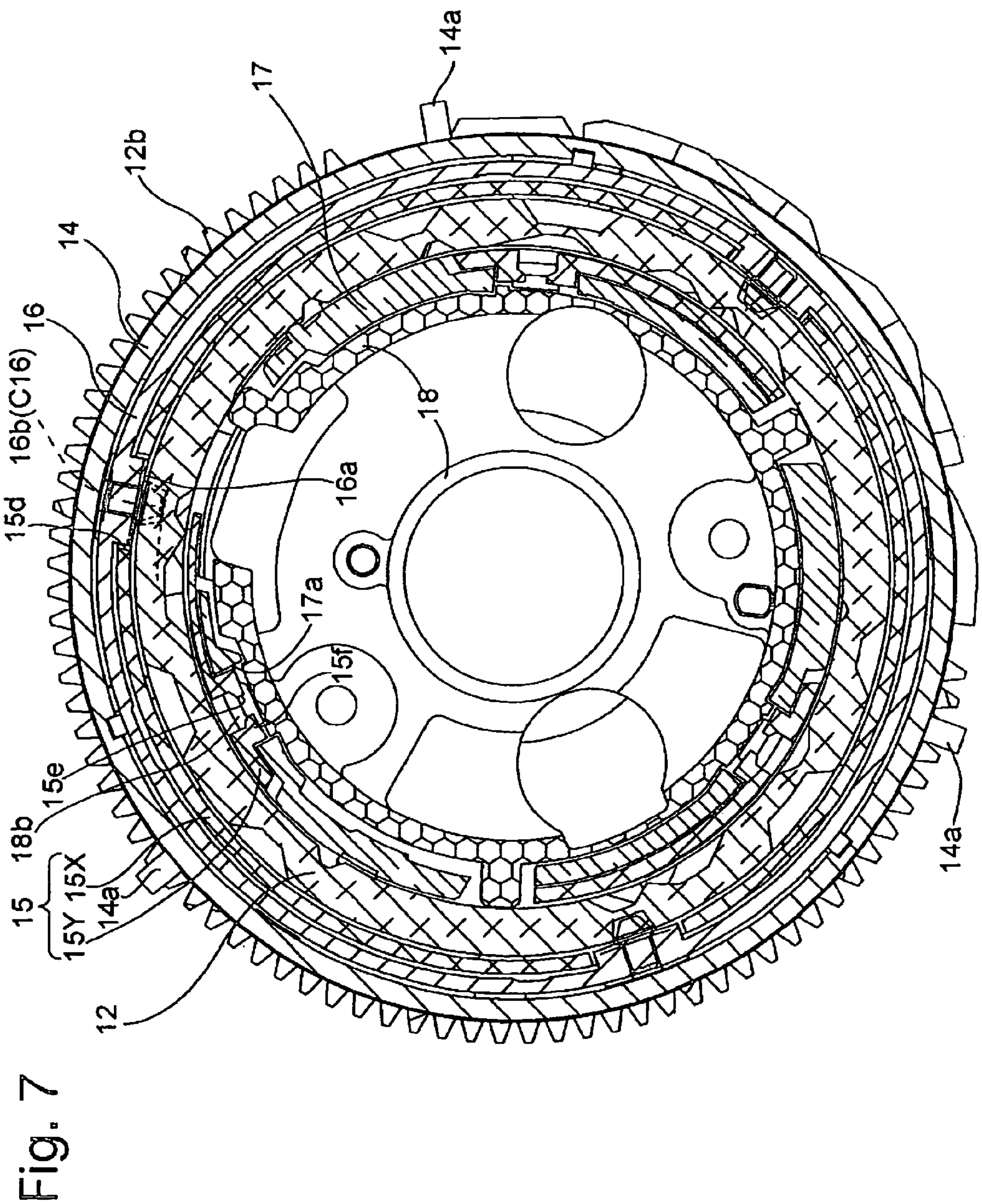
FIG. 7 is a transverse cross sectional view taken along VII—VII line shown in FIG. 3.
Figure 17:
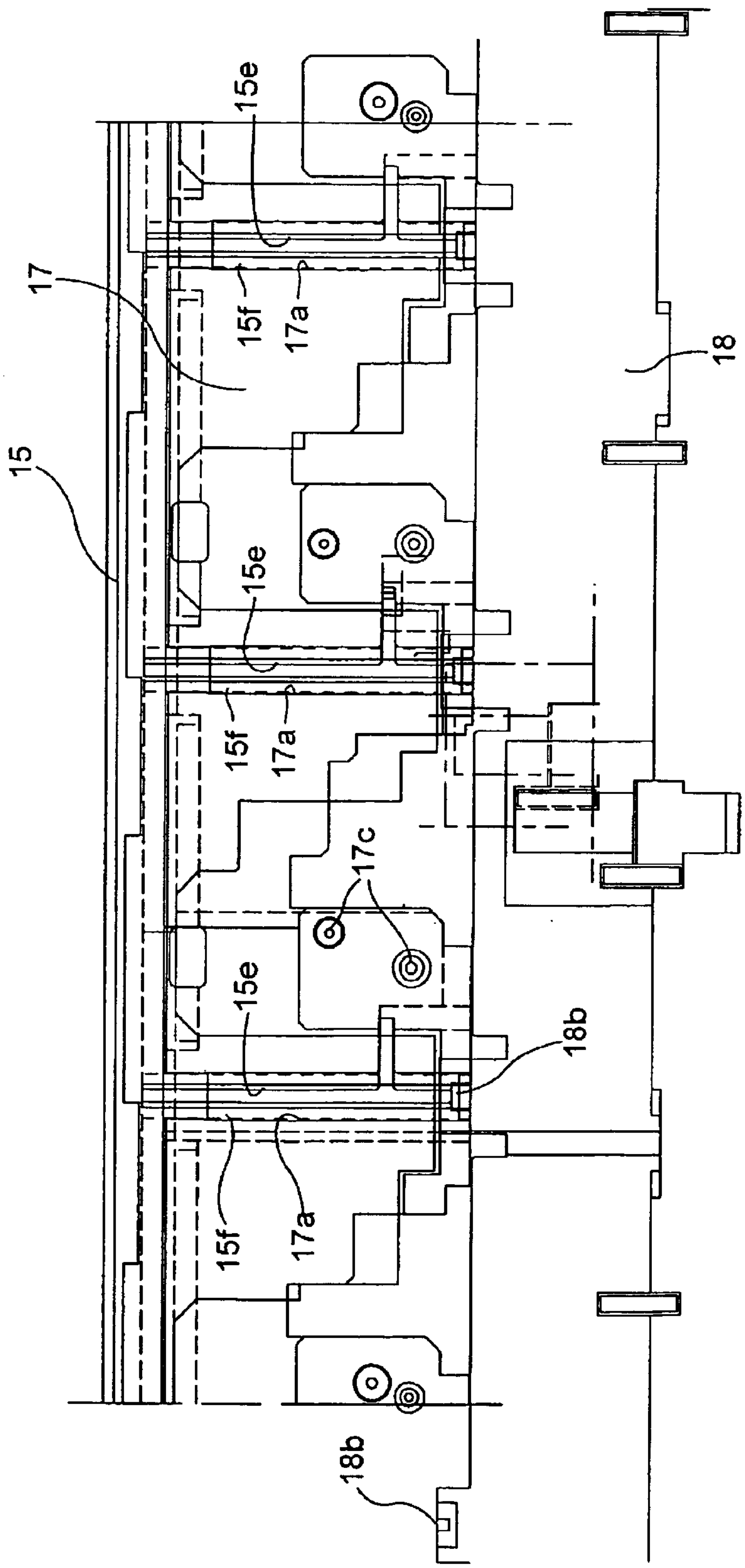
FIG. 17 is a developed view of the first lens group moving ring, the second lens group moving ring and the third lens group moving ring, showing linear guide mechanical linkages among these three moving rings.
Figure 18:
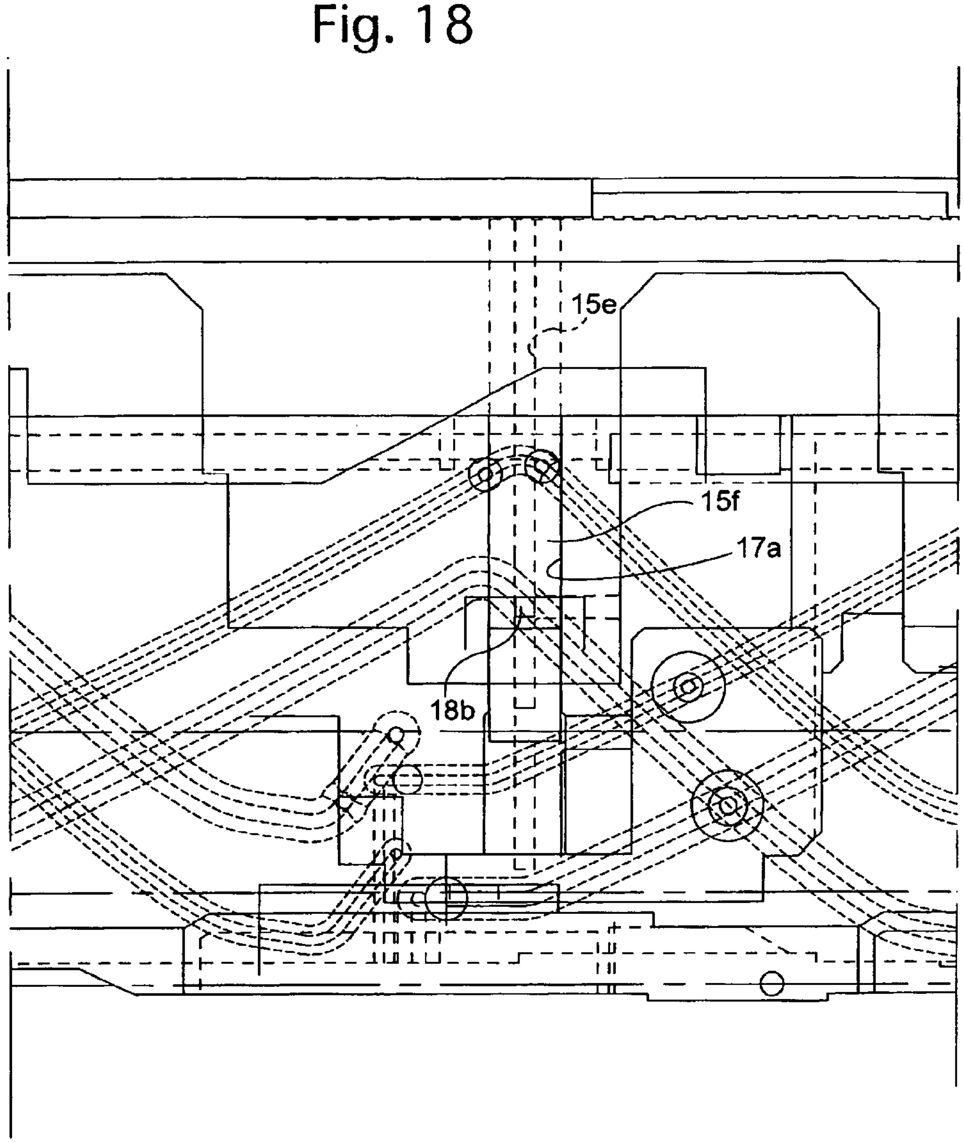
FIG. 18 is an enlarged view of a portion of the developed view shown in FIG. 17.
Figure 19:
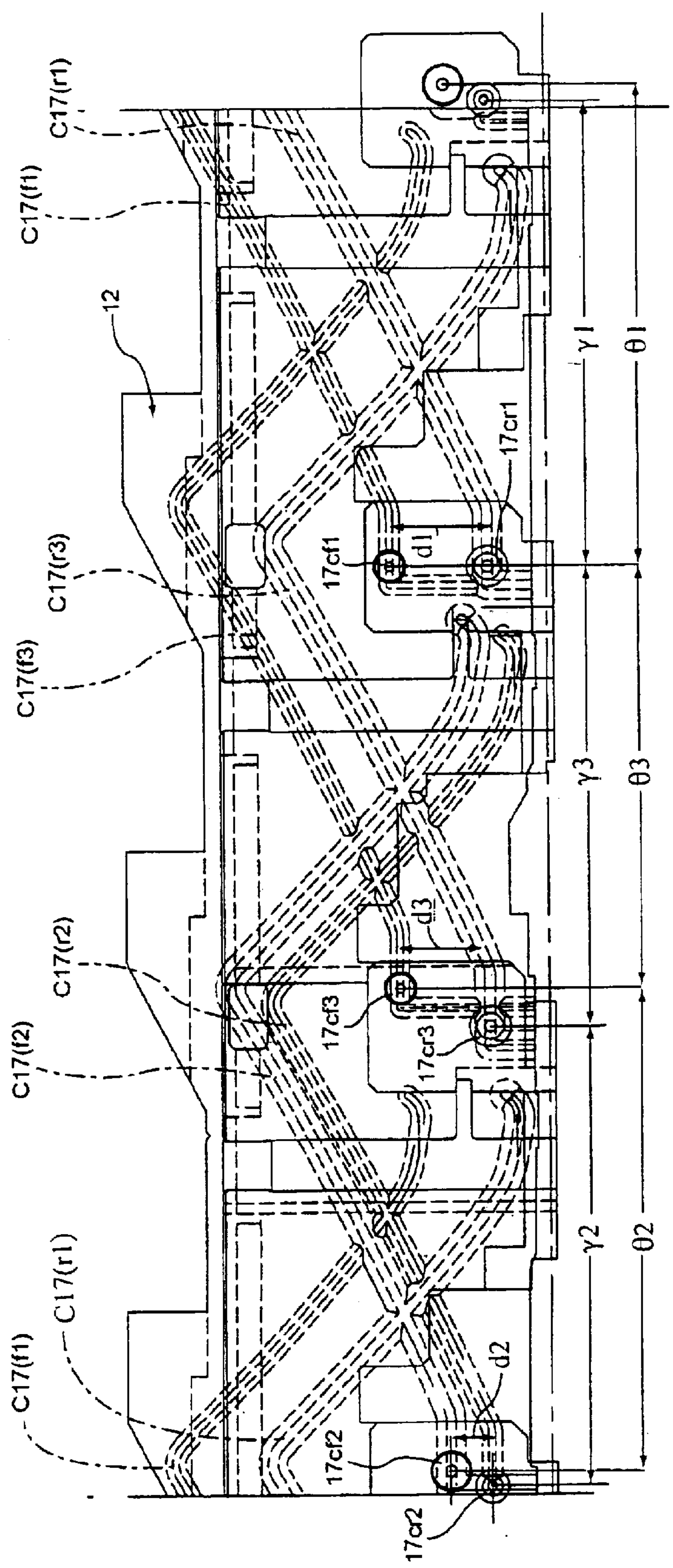
FIG. 19 is a developed view of the cam/helicoid ring and shows the contours of second cam grooves of the cam/helicoid ring for moving the second lens group, and associated cam followers of the second lens group moving ring, showing an embodiment of a cam mechanism of a zoom lens barrel.

The inner ring portion 15Y of the first lens group moving ring 15 is provided on an inner peripheral surface thereof with a set of three linear guide projections 15*f* which are elongated in a direction parallel to the optical axis O, while the second lens group moving ring 17 is provided with a set of three linear guide slots (linear guide through-slots) 17*a* which are elongated in a direction parallel to the optical axis O to be engaged with the set of three linear guide projections 15*f* to be freely slidable relative thereto along the optical axis O (see FIGS. 6, 7 and 17). Each linear guide projection 15*f* is provided along a substantially center thereof with a hanging groove 15*e* which is elongated in a direction parallel to the optical axis O and which has a substantially T-shaped cross section as shown in FIG. 6. The three linear guide projections 15*f* and the three linear guide slots 17*a* constitute a first linear guide mechanism. The rear end of each hanging groove 15*e* is closed (see FIGS. 17 and 18). The second lens group moving ring 17 is provided on an outer peripheral surface thereof with six cam followers 17*c* which are engaged in the set of six second cam grooves C17 of the cam/helicoid ring 12, respectively.

Figure 11:
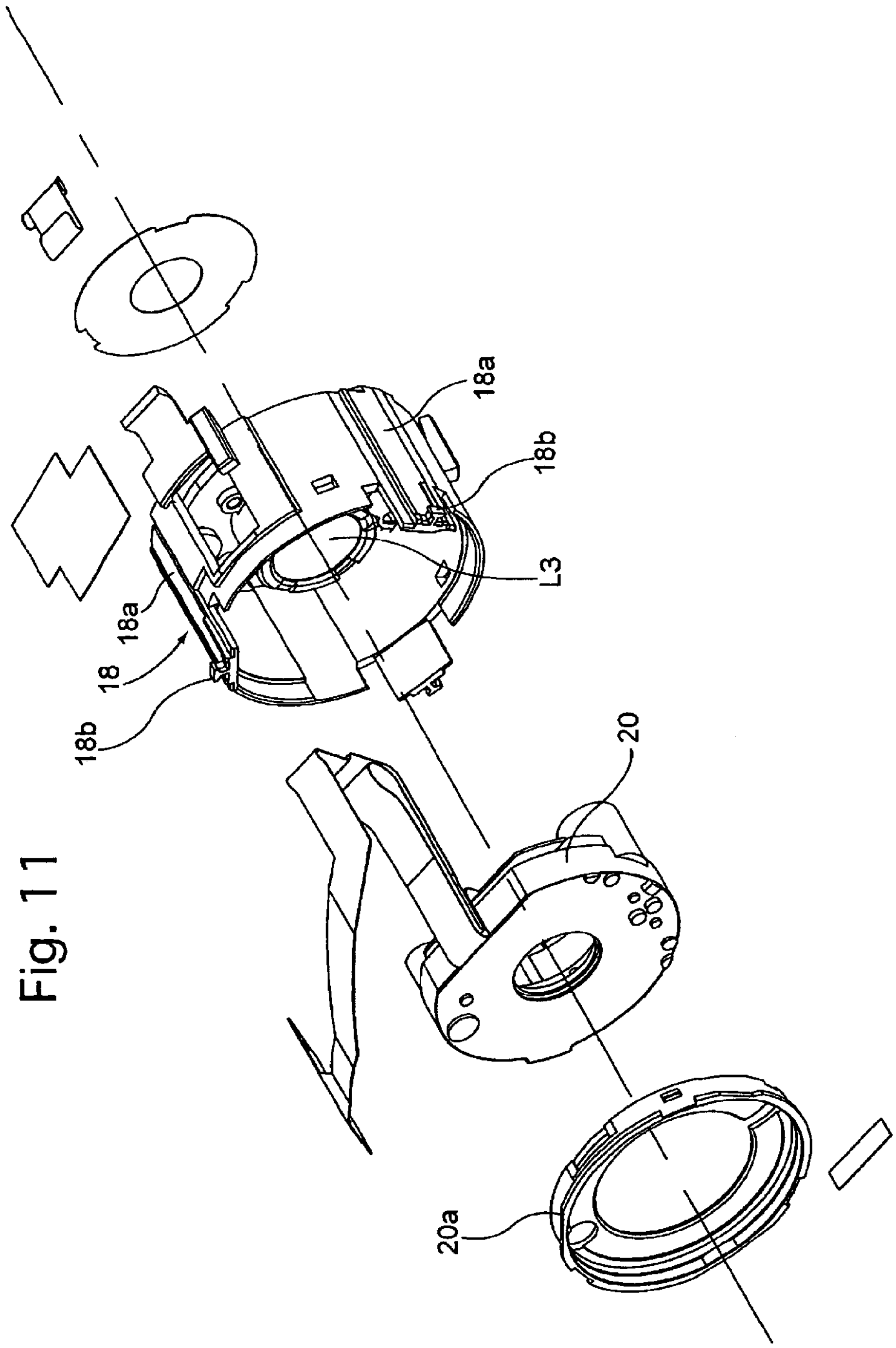
FIG. 11 is an exploded perspective view of a portion of the zoom lens barrel shown in FIG. 3, showing a third lens group moving ring and peripheral elements.

The zoom lens barrel 10 is provided inside the second lens group moving ring 17 with a third lens group moving ring (third lens frame) 18 which supports the third lens group L3. The third lens group moving ring 18 is provided on an outer peripheral surface thereof with a set of three linear guide projections 18*a* which are elongated in a direction parallel to the optical axis O to be engaged in the set of three linear guide slots 17*a* of the second lens group moving ring 17 to be freely slidable relative thereto along the optical axis O, respectively. The third lens group moving ring 18 is provided on a center of each linear guide projection 18*a* at the front end thereof with a linear moving key (stop projection) 18*b* (see FIGS. 11, 17 and 18) which has a substantially T-shaped cross section to be engaged in the associated hanging groove 15*e*. The three linear guide projections 15*f*, the three hanging groove 15*e* and the three linear moving keys 18*b* constitute a second linear guide mechanism. Furthermore, the three linear guide slots 17*a* and the three linear guide projections 18*a* constitute a third linear guide mechanism. As shown in FIG. 11, the zoom lens barrel 10 is provided with a shutter unit 20 which is inserted into the third lens group moving ring 18 to be positioned in front of the third lens group L3. The shutter unit 20 is fixed to the third lens group moving ring 18 by a fixing ring 20*a*. The zoom lens barrel 10 is provided between the third lens group moving ring 18 (the fixing ring 20*a*) and the second lens group moving ring 17 with a compression coil spring 21 which continuously biases the third lens group moving ring 18 rearwards relative to the second lens group moving ring 17. The rear limit of this rearward movement of the third lens group moving ring 18 relative to the second lens group moving ring 17 is determined by the three linear moving keys 18*b* contacting the closed rear ends of the three hanging grooves 15*e*, respectively. Namely, when the zoom lens barrel 10 is in a ready-to-photograph position, each linear moving key 18*b* remains in contact with the rear end of the associated hanging groove 15*e* of the first lens group moving ring 15 to keep the distance between the first lens group L1 and the third lens group L3 constant. When the zoom lens barrel 10 changes from a ready-to-photograph state to the retracted state shown in FIG. 3, a further rearward movement of the first lens group L1 in accordance with contours of the set of three first cam grooves C15, after the third lens group L3 (the third lens group moving ring 18) has reached the mechanical rear moving limit thereof, causes the first lens group L1 to approach the third lens group L3 while compressing the compression coil spring 21 (see FIG. 1). Each linear moving key 18*b* is formed so that the radially outer end thereof bulges to be prevented from coming off the associated hanging groove 15*e*.

Figure 12:
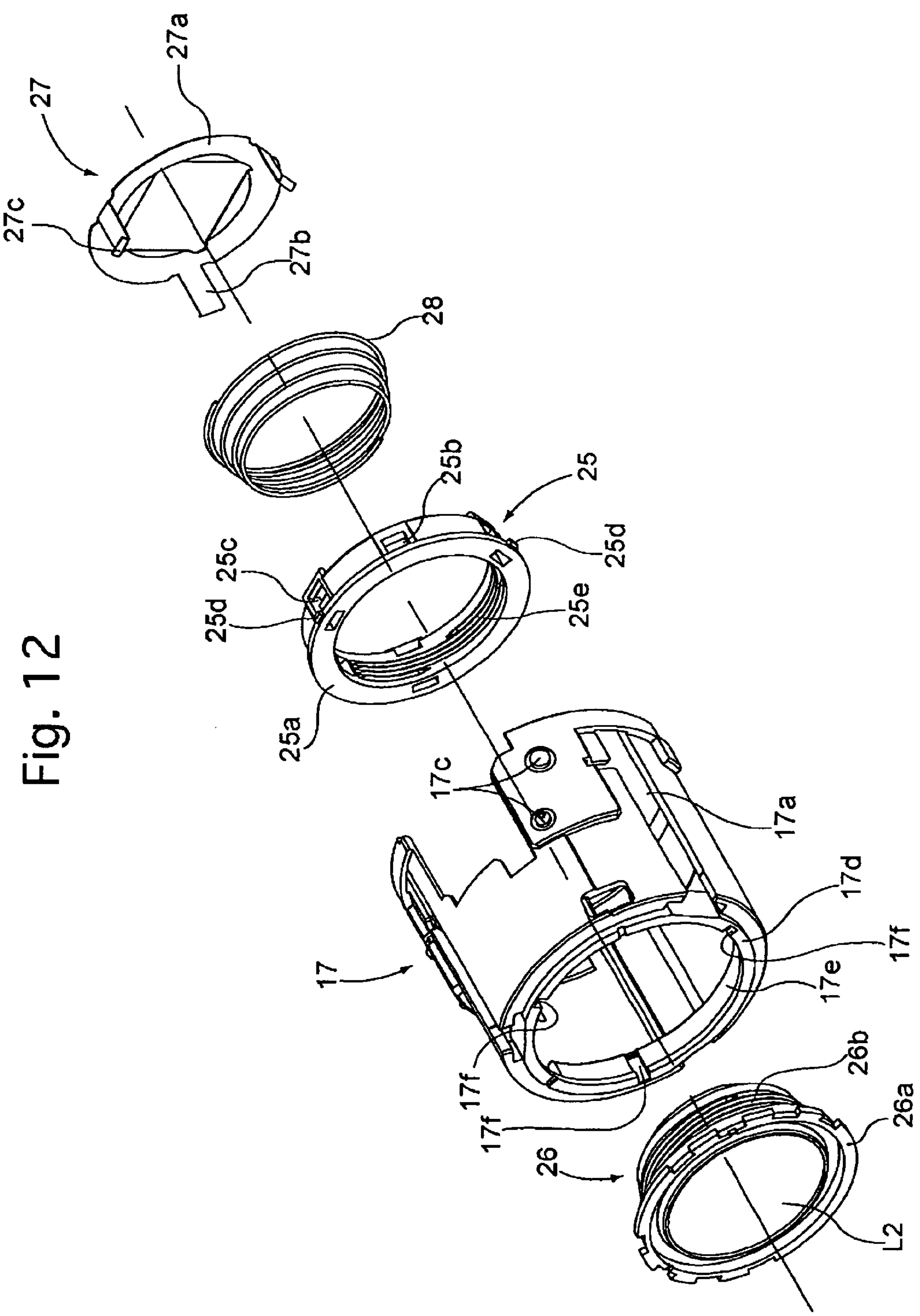
FIG. 12 is an exploded perspective view of a portion of the zoom lens barrel shown in FIG. 3, showing a second lens group moving ring and peripheral elements.
Figure 13:
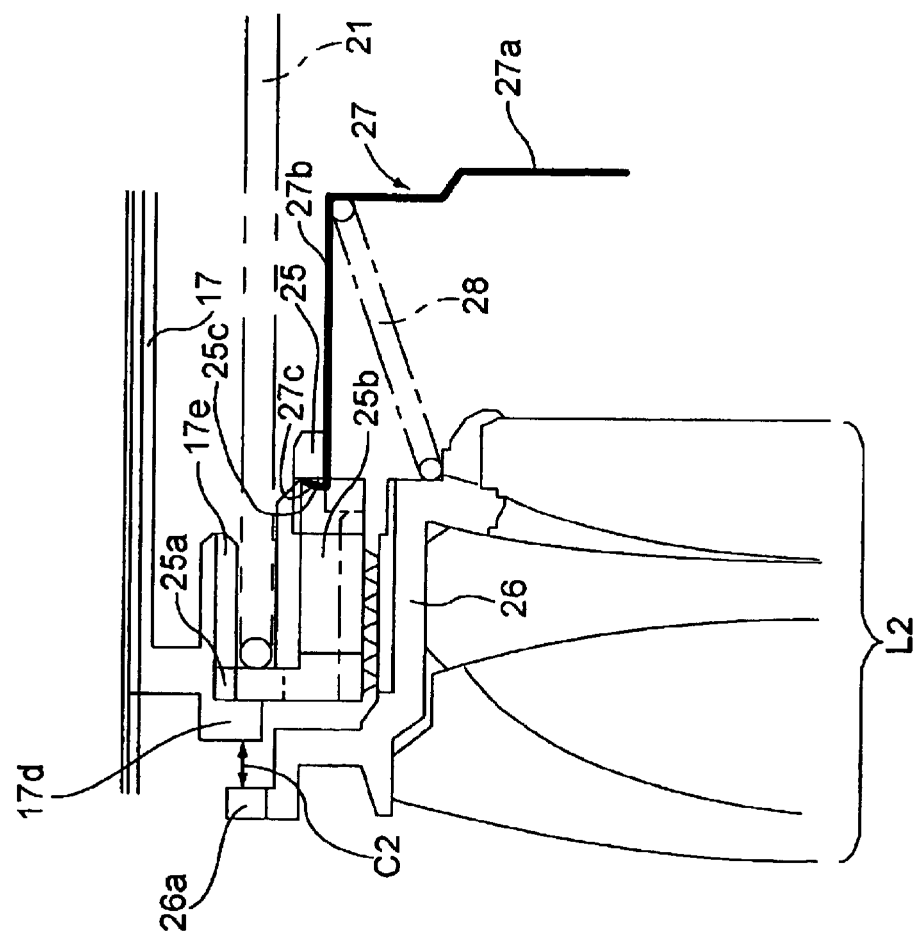
FIG. 13 is a longitudinal view of a portion of the zoom lens barrel shown in FIG. 3, showing a portion of the second lens group moving ring and peripheral elements.
Figure 14:
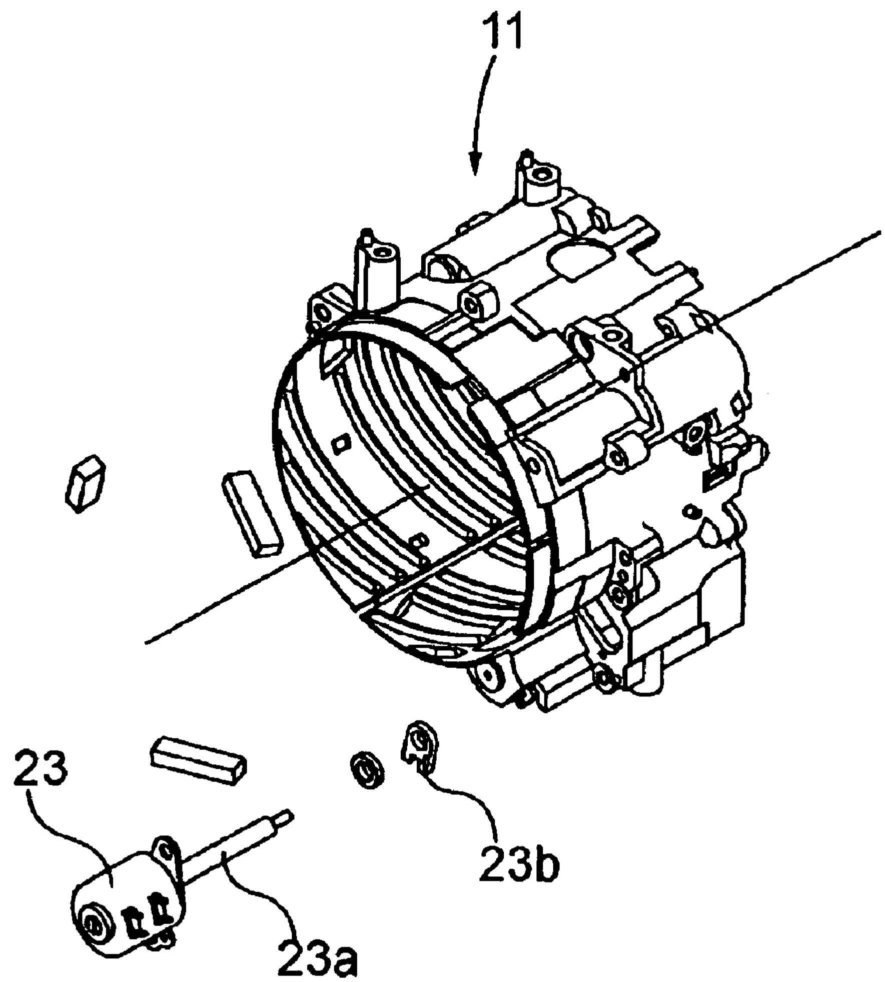
FIG. 14 is an exploded perspective view of a portion of the zoom lens barrel shown in FIG. 3, showing a stationary barrel, a pulse motor supported by the stationary barrel, and peripheral elements, seen from the rear side thereof.

Although a biasing force of the compression coil spring 21 can be applied directly to the second lens group moving ring 17 (i.e., although the second lens group L2 can be fixed to the second lens group moving ring 17), the second lens group L2 is made to be capable of moving rearward relative to the second lens group moving ring 17 for the purpose of further reduction in length of the zoom lens barrel 10 in the retracted state thereof in the present embodiment of the zoom lens barrel. FIGS. 12 and 13 show this structure for the further reduction in length of the zoom lens barrel 10. The second lens group moving ring 17 is provided at the front end thereof with a cylindrical portion 17*e* having an inner flange 17*d*. The zoom lens barrel 10 is provided inside the second lens group moving ring 17 with an intermediate ring 25. The intermediate ring 25 is provided at the front end thereof with a flange portion 25*a* which is fitted in the cylindrical portion 17*e* to be freely slidable on the cylindrical portion 17*e* in the optical axis direction. An end portion of the compression coil spring 21 abuts against the flange portion 25*a*, so that the flange portion 25*a* presses against the inner flange 17*d* due to the resiliency of the compression coil spring 21. As clearly shown in FIG. 12, the second lens group moving ring 17 is provided, on an inner peripheral surface of the cylindrical portion 17*e* at substantially equiangular intervals, with a set of three linear guide grooves 17*f* which are elongated in a direction parallel to said optical axis O, while the intermediate ring 25 is provided on an outer edge of said flange portion 25*a* with a corresponding set of three linear guide projections 25*d* (only two of them appear in FIG. 12) which are engaged in the set of three linear guide grooves 17*f*, respectively, to guide said intermediate ring 25 linearly along the optical axis O without rotating said intermediate ring 25 relative to said second lens group moving ring 17. The zoom lens barrel L2 is provided inside the second lens group moving ring 17 with a second lens group support frame 26 to which the second lens group L2 is fixed. The second lens group support frame 26 is screwed into the intermediate ring 25. Specifically, a male thread 26*b* formed on an outer peripheral surface of the second lens group support frame 26 is engaged with a female thread 25*e* formed on an inner peripheral surface of the intermediate ring 25. Accordingly, the position of the second lens group L2 in the optical axis direction relative to the intermediate ring 25, which is prevented from rotating about the optical axis O, can be adjusted (zooming adjustment) by rotating the second lens group support frame 26 relative to the intermediate ring 25. After this adjustment, the second lens group support frame 26 can be permanently fixed to the intermediate ring 25 by putting drops of an adhesive agent into a radial through hole 25*b* formed on the intermediate ring 25. The second lens group support frame 26 is provided on an outer peripheral surface thereof with an outer flange 26*a*, and a clearance C2 (see FIG. 13) for the zooming adjustment exits between a front end surface of the inner flange 17*d* and the outer flange 26*a*. The compression coil spring 21 biases the intermediate ring 25 forward, and the intermediate ring 25 is held at a position where the flange portion 25*a* contacts with the inner flange 17*d* when the zoom lens barrel 10 is in a ready-to-photograph state. Namely, on the one hand, the position of the second lens group L2 is controlled by the set of six second cam grooves C17 when the zoom lens barrel 10 is in a ready-to-photograph state; on the other hand, the second lens group support frame 26 is pushed rearward mechanically by the rear end of the first lens group support frame 24 to thereby move the outer flange 26*a* of the second lens group support frame 26 rearward to a point where the outer flange 26*a* contacts with the inner flange 17*d* when the zoom lens barrel 10 is retracted to the retracted position thereof. This reduces the length of the zoom lens barrel 10 by a length corresponding to the clearance C2.

The zoom lens barrel 10 is provided immediately behind the intermediate ring 25 with a light shield ring 27 which is supported by the intermediate ring 25. As shown in FIG. 12, the light shield ring 27 is provided with a ring portion 27*a* and a set of three leg portions 27*b* which extend forward from the ring portion 27*a* at intervals of approximately 120 degrees. Each leg portion 27*b* is provided at the front end thereof with a hook portion 27*c* which is formed by bending the tip of the leg portion 27*b* radially outwards. The intermediate ring 25 is provided on an outer peripheral surface thereof with a set of three engaging holes 25*c* with which the hook portions 27*c* of the set of three leg portions 27*b* are engaged, respectively (see FIG. 12). The zoom lens barrel 10 is provided between the light shield ring 27 and the second lens group support frame 26 with a compression coil spring 28 having a substantially truncated conical shape which continuously biases the light shield ring 27 rearwards. When the zoom lens barrel 10 is retracted toward the retracted position, the light shield ring 27 approaches the second lens group support frame 26 while compressing the compression coil spring 28 after reaching the rear moving limit of the light shield ring 27. The lengths of the set of three engaging holes 25*c* in the optical axis direction are determined to allow the ring portion 27*a* to come into contact with the second lens group support frame 26.

The compression coil spring 28 also serves as a device for removing backlash between the intermediate ring 25 and the second lens group support frame 26 when the second lens group support frame 26 is rotated relative to the intermediate ring 25 for the aforementioned zooming adjustment. The zooming adjustment is performed by rotating the second lens group support frame 26 relative to the intermediate ring 25 to adjust the position of the second lens group L2 in the optical axis direction relative to the intermediate ring 25 while viewing the position of an object image. This zooming adjustment can be performed with precision with backlash between the intermediate ring 25 and the second lens group support frame 26 being removed by the compression coil spring 28.

The zoom lens barrel 10 is provided behind the third lens group moving ring 18 with a fourth lens group support frame 22 to which the fourth lens group L4 is fixed. As described above, the fourth lens group L4 is moved to make a slight focus adjustment to the vari-focal lens system to adjust a slight focal deviation thereof while the first through third lens groups L1, L2 and L3 are moved relative to one another to vary the focal length of the zoom lens system, and is also moved as a focusing lens group. The fourth lens group L4 is moved along the optical axis O by rotation of a pulse motor 23 (see FIGS. 5 and 14). The pulse motor 23 is provided with a rotary screw shaft 23*a*. A nut member 23*b* is screwed on the rotary screw shaft 23*a* to be prevented from rotating relative to the stationary barrel 11. The nut member 23*b* is continuously biased by an extension coil spring S in a direction to contact with a leg portion 22*a* which projects radially outwards from the fourth lens group support frame 22 (see FIGS. 5 and 15). The fourth lens group support frame 22 is prevented from rotating by guide bars 22*b*, which extend in direction parallel to the optical axis direction, which are slidably engaged with radial projecting followers 22*c* which extend radially outwards from the fourth lens group support frame 22 (see FIGS. 2 and 15). Accordingly, rotations of the pulse motor 23 forward and reverse cause the fourth lens group support frame 22 (the fourth lens group L4) to move forward and rearward along the optical axis O, respectively. Rotations of the pulse motor 23 are controlled in accordance with information on focal length and/or information on object distance.

Accordingly, in the above described embodiment of the zoom lens barrel, rotating the cam/helicoid ring 12 by rotation of the drive pinion 13 causes the first lens group moving ring 15, the exterior ring 16 and the second lens group moving ring 17 to move along the optical axis O in accordance with contours of the set of three first cam grooves C15, the set of three third cam grooves C16 and the set of six second cam grooves C17, respectively. When the first lens group moving ring 15 moves forward from the retracted position, firstly the three linear moving keys 18*b* contact the rear ends of the three hanging grooves 15*e*, respectively, and subsequently the third lens group moving ring 18 moves together with the first lens group moving ring 15 with the three linear moving key 18*b* remaining in contact with the rear ends of the three hanging grooves 15*e*, respectively. The position of the fourth lens group L4 is controlled by the pulse motor 23, whose rotations are controlled in accordance with information on focal length, to make a slight focus adjustment to the vari-focal lens system to adjust a slight focal deviation thereof. As a result, reference moving paths as shown in FIG. 1 for performing a zooming operation are obtained. Rotations of the pulse motor 23 are also controlled in accordance with information on object distance to perform a focusing operation.

In the above described embodiment of the zoom lens barrel, the six second cam grooves C17 for moving the second lens group moving ring 17 are formed on an inner peripheral surface of the cam/helicoid ring (cam ring/first ring member) 12. The six second cam grooves C17 have the same reference cam diagrams, and include three front second cam grooves C17 (C17*f*1, C17*f*2 and C17*f*3) and three rear second cam grooves C17 (C17*r*1, C17*r*2 and C17*r*3), wherein the three front second cam grooves C17 and the three rear second cam grooves C17 are apart from each other in the optical axis direction (vertical direction as viewed in FIG. 19). Furthermore, the three front second cam grooves C17 are positioned at predetermined intervals in a circumferential direction of the cam/helicoid ring 12 while the three rear cam grooves C17 are arranged at predetermined intervals in the circumferential direction of the cam/helicoid ring 12 (see FIG. 19). The second lens group moving ring 17 is linearly guided along the optical axis O to move linearly along the optical axis O in accordance with contours of the six second cam grooves C17 when the cam/helicoid ring 12 rotates. A feature of the present invention resides in the configuration of the six second cam grooves C17 on the second lens group moving ring 17. The six second cam grooves C17 are in a one-to-one correspondence with the six cam followers 17*c*, which are engaged in the six second cam grooves C17, respectively, while the width and the depth of each cam groove C17 correspond to the width and the depth of the associated cam follower 17*c*, respectively. Accordingly, in the following descriptions, a discussion of the position and the contours of each cam groove C17 (or each cam follower 17*c*) logically corresponds a discussion of the position and the contours of the associated cam follower 17*c* (or the associated cam groove C17).

Specifically, the above described embodiment of the cam mechanism composed of the six cam grooves C17 and the six cam followers 17*c* has the following six features (A) through (F).

(A) Three groove/follower groups (each group of which consists of two cam grooves C17 and the associated two cam followers 17*c*) are arranged at three positions in the circumferential direction of the cam/helicoid ring 12, while each groove/follower group includes a set of two cam grooves (front and rear cam grooves) C17 which are apart from each other in the axial direction of the cam/helicoid ring 12. Specifically, the three groove/follower groups include a first set of two cam grooves C17 (C17*f*1 and C17*r*1) which are apart from each other in the axial direction of the cam/helicoid ring 12, a second set of two cam grooves C17 (C17*f*2 and C17*r*2) which are apart from each other in the axial direction of the cam/helicoid ring 12, and a third set of two cam grooves C17 (C17*f*3 and C17*r*3) which are apart from each other in the axial direction of the cam/helicoid ring 12, respectively. Accordingly, six cam grooves C17 in total are formed on the cam/helicoid ring 12.

(B) The six cam grooves C17 can also be classified into two groups which are apart from each other in the optical axis direction: a front cam-groove group consisting of the three cam grooves C17*f*1, C17*f*2 and C17*f*3, and a rear cam-groove group consisting of the three cam grooves C17*r*1, C17*r*2 and C17*r*3.

(C) Each of the front and rear cam grooves C17 of each groove/follower group intersects all the other cam grooves C17 of the remaining two groove/follower groups. For instance, each of the front and rear cam grooves C17*f*1 and C17*r*1 of the first set of two cam grooves C17 intersect all the other four cam grooves C17: the cam grooves C17*f*2 and C17*r*2 of the second set of two cam grooves C17 and the cam grooves C17*f*3 and C17*r*3 of the third set of two cam grooves C17.

(D) The three cam grooves C17*f*1, C17*f*2 and C17*f*3 of the front cam-groove group are arranged in the circumferential direction of the cam/helicoid ring 12 at irregular intervals, while the three cam grooves C17*r*1, C17*r*2 and C17*r*3 of the rear cam-groove group are arranged in the circumferential direction of the cam/helicoid ring 12 at irregular intervals. Namely, intervals (angles) $\theta$1, $\theta$2 and $\theta$3 among the three cam followers 17*c* (17*cf*1, 17*cf*2 and 17*cf*3) of the front cam-follower group in the circumferential direction of the cam/helicoid ring 12 are different from one another, while intervals (angles) $\gamma$1, $\gamma$2 and $\gamma$3 among the three cam followers 17*c* (17*cr*1, 17*cr*2 and 17*cr*3) of the rear cam-follower group in the circumferential direction of the cam/helicoid ring 12 are different from one another. In addition, the positions of the front and rear cam grooves C17*f*1 and C17*r*1 in the circumferential direction of the cam/helicoid ring 12 are the same, whereas the positions of the front and rear cam grooves C17*f*2 and C17*r*2 in the circumferential direction of the cam/helicoid ring 12 are mutually different while the positions of the front and rear cam grooves C17*f*3 and C17*r*3 in the circumferential direction of the cam/helicoid ring 12 are mutually different.

(E) A distance d1 between the first set of two cam grooves C17*f*1 and C17*r*1 in the optical axis direction, a distance d2 between the second set of two cam grooves C17*f*2 and C17*r*2 in the optical axis direction, and a distance d3 between the third set of two cam grooves C17*f*3 and C17*r*3 are different from one another.

(F) The widths of the first set of two cam grooves C17*f*1 and C17*r*1 are mutually different, the widths of the second set of two cam grooves C17*f*2 and C17*r*2 are mutually different, and the widths of the third set of two cam grooves C17*f*3 and C17*r*3 are mutually different.

The above described embodiment of the cam mechanism having the above six features (A) through (F) is a desirable embodiment for preventing each second cam follower 17*f* from coming off the associated second cam groove C17 in the above described arrangement wherein adjacent cam grooves of the cam ring (12) which have the same reference cam diagrams intersect each other for the purpose of reducing the diameter of the cam ring. However, as mentioned above, prevention of each cam follower (17*c*) from coming off the associated cam groove (C17) at an intersection between this cam groove (C17) and another cam groove (C17) can be accomplished as mentioned above in a cam mechanism of a lens barrel wherein at least two groove/follower groups (each of which consists of a front groove/follower set and a rear groove/follower set which are positioned at different positions in an optical axis direction) are positioned at different positions in a circumferential direction, each of the front groove/follower set and the rear groove/follower set consisting of a cam groove of the plurality of cam grooves and an associated cam follower of the plurality of cam followers, wherein the cam grooves of one of the two groove/follower groups intersect the cam grooves of another of the two groove/follower groups, respectively, and wherein at least one of the following two conditions (A) and (B) is satisfied:

(A) a distance (d1, d2 or d3) in the optical axis direction between the front groove/follower set and the rear groove/follower set of one of the two groove/follower groups in the optical axis direction is different from that between the front groove/follower set and the rear groove/follower set of another of the two groove/follower groups, and (B) a distance in the circumferential direction between the two front groove/follower sets of the two groove/follower groups is different from that between the two rear groove/follower sets of said two groove/follower groups.

Figure 20A:
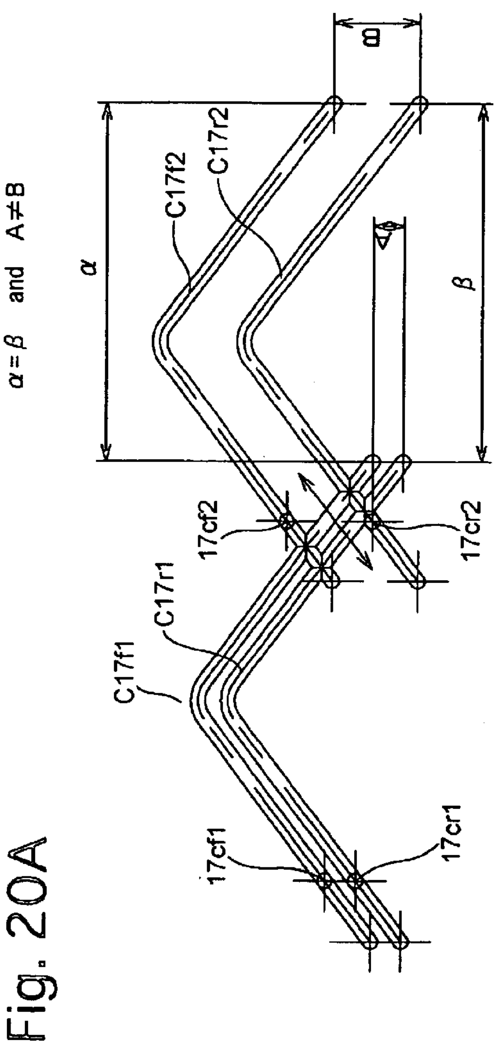
FIG. 20A is a diagrammatic developed view of second cam grooves of the cam/helicoid ring and associated cam followers of the second lens group moving ring, showing another embodiment of the cam mechanism in which two groove/follower groups are positioned at different positions in the circumferential direction of the cam/helicoid ring.
Figure 20B:
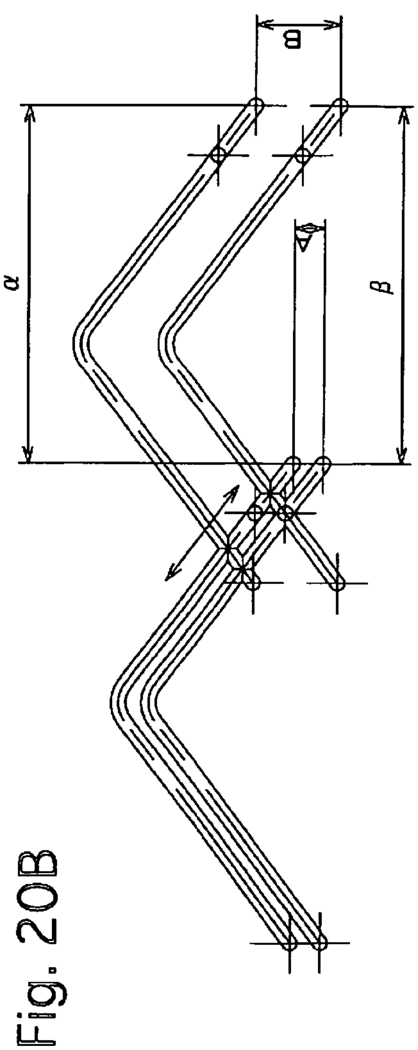
FIG. 20B is a view similar to that of FIG. 20A, showing the embodiment of the cam mechanism shown in FIG. 20A in a different state.

FIGS. 20A and 20B show another embodiment of the cam mechanism in which two groove/follower groups are positioned at different positions in the circumferential direction of the cam/helicoid ring 12, wherein the distance in the optical axis direction between the front groove/follower set and the rear groove/follower set of one of the two groove/follower groups in the optical axis direction is different from that between the front groove/follower set and the rear groove/follower set of another of the two groove/follower groups. Specifically, a distance a in the circumferential direction of the cam/helicoid ring 12 between the front cam groove (C17*f*1) of the first set of two cam grooves C17 and the front cam groove (C17*f*2) of the second set of two cam grooves C17 is identical to a distance $\beta$ in the circumferential direction of the cam/helicoid ring 12 between the rear cam groove (C17*r*1) of the first set of two cam grooves C17 and the rear cam groove (C17*r*2) of the second set of two cam grooves C17, and a distance A in the optical axis direction between the front and rear cam grooves (C17*f*1 and C17*r*1) of the first set of two cam grooves C17 is different from a distance B in the optical axis direction between the front and rear cam grooves (C17*f*2 and C17*r*2) of the second set of two cam grooves C17.

Figure 21A:
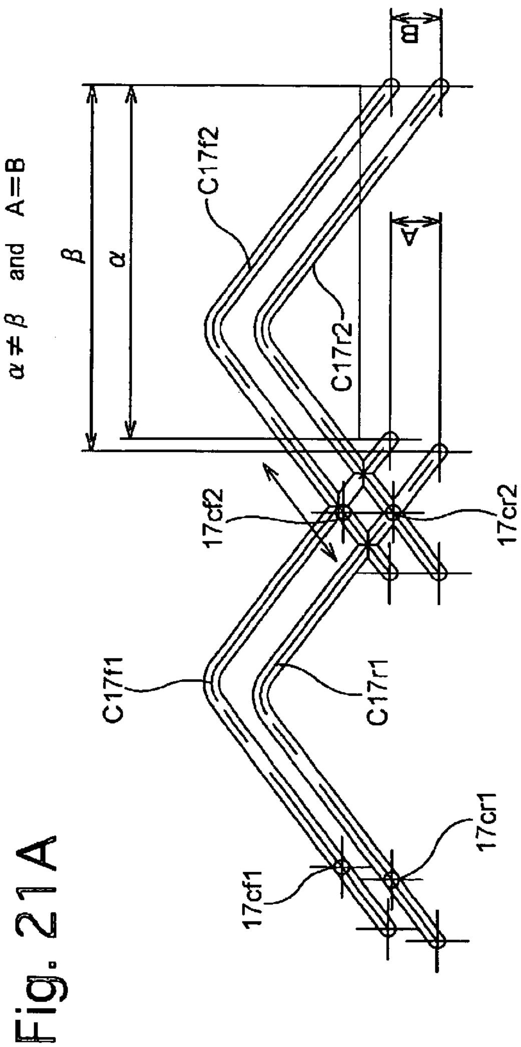
FIG. 21A is a diagrammatic developed view of second cam grooves of the cam/helicoid ring and associated cam followers of the second lens group moving ring, showing another embodiment of the cam mechanism in which two groove/follower groups are positioned at different positions in the circumferential direction of the cam/helicoid ring.
Figure 21B:
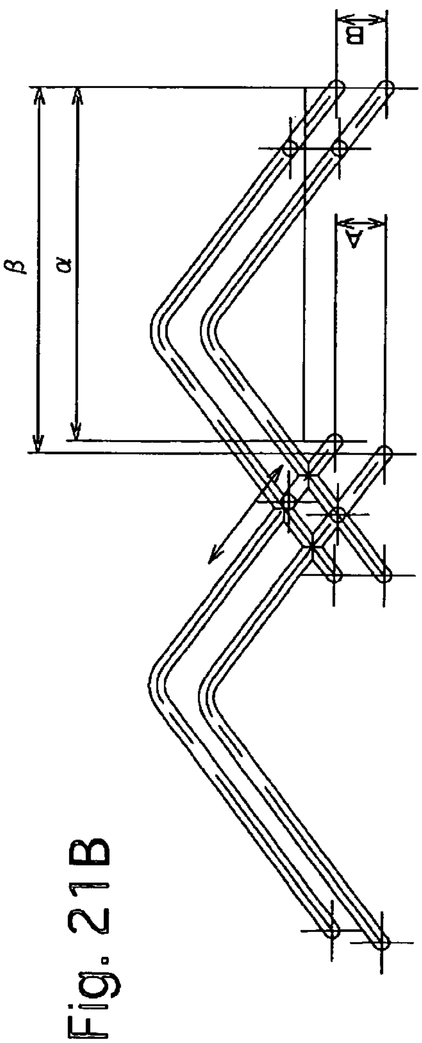
FIG. 21B is a view similar to that of FIG. 21A, showing the embodiment of the cam mechanism shown in FIG. 21A in a different state.

FIGS. 21A and 21B show another embodiment of the cam mechanism in which two groove/follower groups are positioned at different positions in the circumferential direction of the cam/helicoid ring 12, wherein the distance in the circumferential direction between the two front groove/follower sets of the two groove/follower groups is different from that between the two rear groove/follower sets of the two groove/follower groups, in contrast to the embodiment shown in FIGS. 20A and 20B. Specifically, the distance A between the front and rear cam grooves (C**17*f*1 and C17*r*1) of the first set of two cam grooves C17 is identical to the distance B between the front and rear cam grooves (C17*f*2 and C17*r*2) of the second set of two cam grooves C17, while the distance a between the front cam groove (C17*f*1) of the first set of two cam grooves C17 and the front cam groove (C17*f*2) of the second set of two cam grooves C17 is different from the distance β between the rear cam groove (C17*r*1) of the first set of two cam grooves C17 and the rear cam groove (C17*r*2) of the second set of two cam grooves C17**.

The two cam followers (front and rear cam followers) of each groove/follower group are not simultaneously positioned at associated two intersections of cam grooves C17, respectively, as shown in each of the above two embodiments shown in FIGS. 20A through 21B. This prevents each cam groove C17 from coming off the associated cam groove 17*c*.

Figure 22:
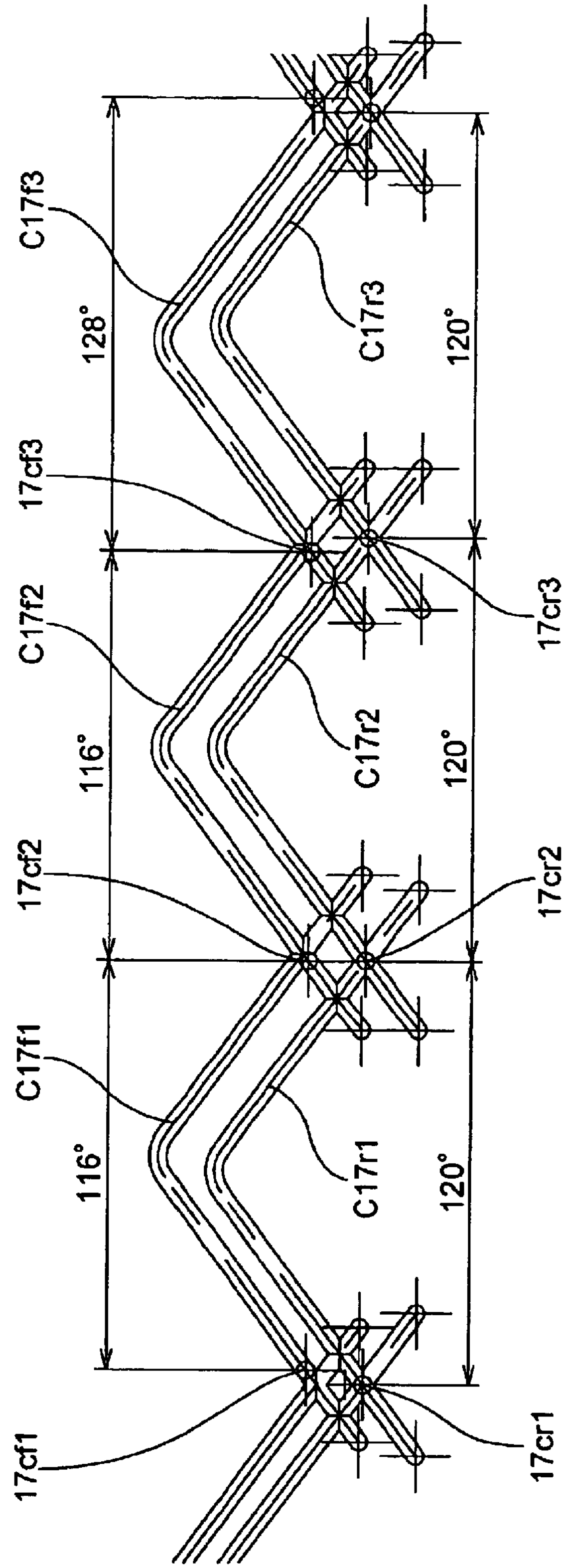
FIG. 22 is a diagrammatic developed view of second cam grooves of the cam/helicoid ring and associated cam followers of the second lens group moving ring, showing another embodiment of the cam mechanism in which three groove/follower groups are positioned at different positions in the circumferential direction of the cam/helicoid ring.

FIG. 22 shows another embodiment of the cam mechanism in which three groove/follower groups are positioned at different positions in the circumferential direction of the cam/helicoid ring, wherein the distance between the front and rear cam grooves (C**17*f*1 and C17*r*1) of the first set of two cam grooves C17, the distance between the front and rear cam grooves (C17*f*2 and C17*r*2) of the second set of two cam grooves C17 and the distance between the front and rear cam grooves (C17*f*3 and C17*r*3) of the third set of two cam grooves C17 are all the same, and wherein intervals (angles) among the three cam followers 17***c* (**17*cf*1, 17*cf*2 and 17*cf*3) of the front cam-follower group in the circumferential direction of the cam/helicoid ring 12 are irregular intervals (specifically, intervals of 116 degrees, 116 degrees and 128 degrees) while intervals (angles) among the three cam followers 17***c* (**17*cr*1, 17*cr*2 and 17*cr*3) of the rear cam-follower group in the circumferential direction of the cam/helicoid ring 12** are regular intervals (specifically, intervals of 120 degrees).

In each of all the above described embodiments, each cam second follower 17*c* can be prevented from coming off the associated second cam groove C17 more securely if the cam mechanism adopts at least one of the following four conditions (A) through (D).

(A) At least one of the following two conditions (1) and (2) is satisfied: (1) the front groove/follower sets of the three groove/follower groups are positioned at irregular intervals in the circumferential direction, and (2) the rear groove/follower sets of the three groove/follower groups are positioned at irregular intervals in the circumferential direction.

(B) A distance in the optical axis direction between the front groove/follower set and the rear groove/follower set of one of the three groove/follower groups in the optical axis direction is different from that between the front groove/follower set and the rear groove/follower set of another of the three groove/follower groups.

(C) The cam groove of the front groove/follower set and the cam groove of the rear groove/follower set are different in at least one of width and depth for at least one of the three groove/follower groups. Similar to making the width of the cam groove of the front groove/follower set and the width of the cam groove of the rear groove/follower set different from each other, making the depth of the cam groove of the front groove/follower set and the depth of the cam groove of the rear groove/follower set different from each other is effective at preventing each cam follower from coming off the associated cam groove. However, making the depth of the cam groove of the front groove/follower set and the depth of the cam groove of the rear groove/follower set different from each other (e.g., making the depth of one cam groove C17 greater than the depth of another cam groove C17) is disadvantageous to a reduction in diameter of the lens barrel.

(D) The width relationship between the cam groove of the front groove/follower set and the cam groove of the rear groove/follower set of one of the three groove/follower groups is different from that between the cam groove of the front groove/follower set and the cam groove of the rear groove/follower set of another of the three groove/follower groups.

The arrangement of the six cam grooves (C17) can be determined depending on which of these four conditions (A) through (D) is to be adopted.

Figure 23:
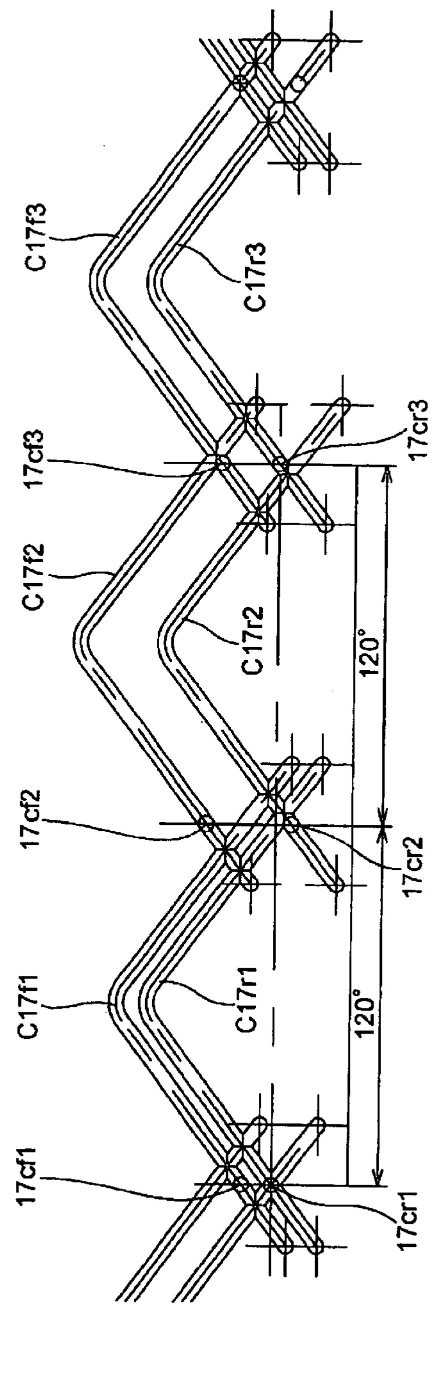
FIG. 23 is a view similar to that of FIG. 22, showing another embodiment of the cam mechanism in which three groove/follower groups are positioned at different positions in the circumferential direction of the cam/helicoid ring.

FIG. 23 shows another embodiment of the cam mechanism in which the three cam grooves C**17*f*1, C17*f*2 and C17*f*3 of the front cam-groove group are positioned at regular intervals (intervals of 120 degrees) in the circumferential direction of the cam/helicoid ring 12, and also the cam grooves C17*r*1, C17*r*2 and C17*r*3 of the rear cam-groove group are positioned at regular intervals (intervals of 120 degrees) in the circumferential direction of the cam/helicoid ring 12. In addition, the distance between the cam grooves C17*f*1 and C17*r*1 of the first groove/follower group in the optical axis direction, the distance between the cam grooves C17*f*2 and C17*r*2 of the second groove/follower group in the optical axis direction and the distance between the cam grooves C17*f*3 and C17*r*3** of the third groove/follower group in the optical axis direction are mutually different.

Figure 24:
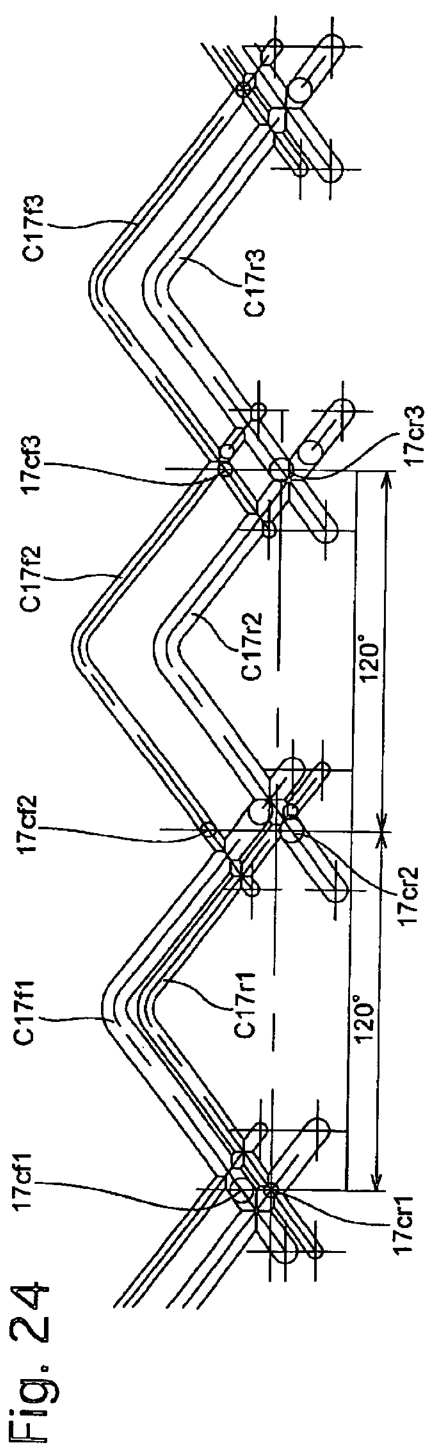
FIG. 24 is a view similar to that of FIG. 22, showing another embodiment of the cam mechanism in which three groove/follower groups are positioned at different positions in the circumferential direction of the cam/helicoid ring.

FIG. 24 shows another embodiment of the cam mechanism in which the three cam grooves C**17*f*1, C17*f*2 and C17*f*3 of the front cam-groove group are positioned at regular intervals (intervals of 120 degrees) in the circumferential direction of the cam/helicoid ring 12, and also the cam grooves C17*r*1, C17*r*2 and C17*r*3 of the rear cam-groove group are positioned at regular intervals (intervals of 120 degrees) in the circumferential direction of the cam/helicoid ring 12. In addition, the distance between the cam grooves C17*f*1 and C17*r*1 of the first groove/follower group in the optical axis direction, the distance between the cam grooves C17*f*2 and C17*r*2 of the second groove/follower group in the optical axis direction and the distance between the cam grooves C17*f*3 and C17*r*3 of the third groove/follower group in the optical axis direction are mutually different. Additionally, the widths of the cam grooves C17*f*1 and C17*r*1 are different from each other, the widths of the cam grooves C17*f*2 and C17*r*2 are different from each other, and the widths of the cam grooves C17*f*3 and C17*r*3 are different from each other. Furthermore, the width of the front cam groove C17*f*2 of the second groove/follower group is smaller than the width of the rear cam groove C17*r*2 of the second groove/follower group while the width of the front cam groove C17*f*3 of the third groove/follower group is smaller than the width of the rear cam groove C17*r*3 of the third groove/follower group, whereas the width of the front cam groove C17*f*1 of the first groove/follower group is greater than the width of the rear cam groove C17*r*1** of the first groove/follower group. Namely, the width relationship between the front and rear cam grooves in one of the three groove/follower groups is opposite to the width relationship between the front and rear cam grooves in either one of the remaining two groove/follower groups.

Figure 25A:
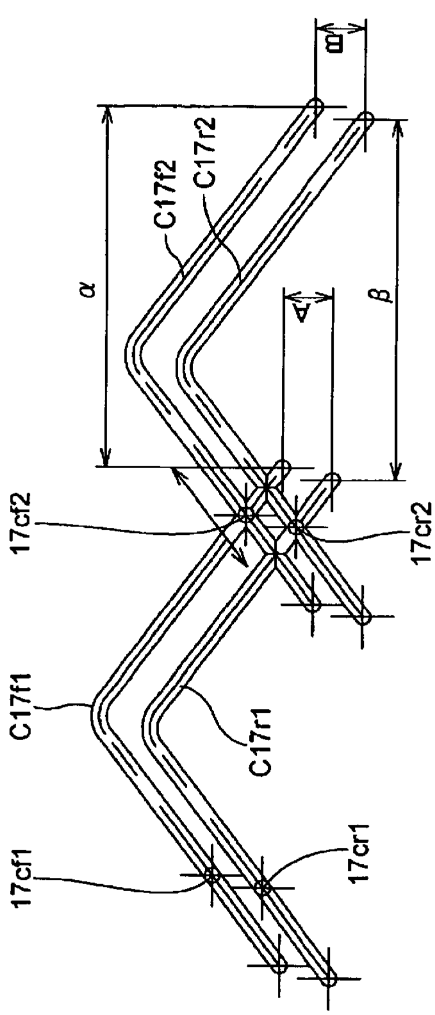
FIG. 25A is a diagrammatic developed view of cam grooves and associated cam followers, showing a comparative example of the placement of the cam followers and the associated cam followers of the cam mechanism which is to be compared with those of a cam mechanism according to the present invention.
Figure 25B:
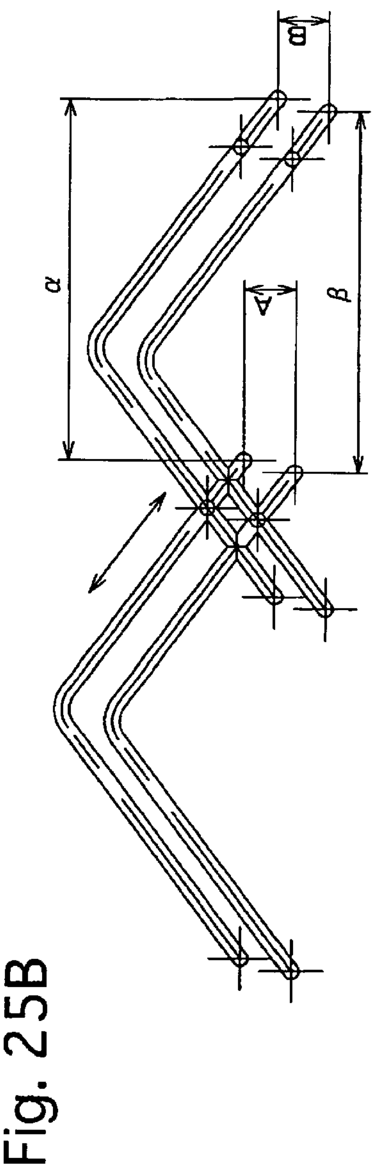
FIG. 25B is a view similar to that of FIG. 25A, showing the comparative example shown in FIG. 25A in a different state.

FIGS. 25A and 25B show a comparative example of the cam mechanism, wherein two groove/follower groups are positioned at different positions in the circumferential direction of the cam/helicoid ring 12, wherein the distance in the optical axis direction between the front groove/follower set and the rear groove/follower set of one of the two groove/follower groups in the optical axis direction is identical to that between the front groove/follower set and the rear groove/follower set of the other groove/follower group, and wherein the distance in the circumferential direction between the two front groove/follower sets of the two groove/follower groups is identical to that between the two rear groove/follower sets of the two groove/follower groups. In this comparative example, even if the positions of the front groove/follower set and the rear groove/follower set are shifted relative to each other in the circumferential direction of the cam/helicoid ring 12, the two cam followers of each groove/follower group (front and rear cam followers C17*f*1 and C17*r*1, or C17*f*2 and C17*r*2) are simultaneously positioned at the intersection of the two cam grooves C17*f*1 and C17*f*2 and the intersection of the two cam grooves C17*r*1 and C17*r*2, respectively. This may cause each cam groove C17 to come off the associated cam groove 17*c*.

With the above described structures for preventing each cam follower 17*c* which is engaged in the associated cam groove C17 from entering another cam groove C17 accidentally at an intersection between these two cam grooves, it is possible to design a zoom lens barrel including a cam ring, on which cam grooves intersecting each other are formed, wherein each cam groove C17 can be made sufficiently long within the area of the inner peripheral surface of the cam/helicoid ring 12. Accordingly, the angle of inclination of each cam groove C17 can be made gentle, which makes it possible to achieve a reduction in diameter of the zoom lens barrel 10 and a smooth zooming operation.

The zoom lens barrel 10 which has been discussed above with reference to FIGS. 1 through 19 is just an example to which a cam mechanism devised according to the present invention is applied. The present invention can be applied not only to a zoom lens barrel such as the above described zoom lens barrel 10, but also to any other zoom lens barrel including a cam ring and a lens support ring, regardless of whether the cam ring includes a helicoid such as the male helicoid 12*a* of the cam/helicoid ring 12.

Although a plurality of cam grooves and a corresponding plurality of cam followers are formed on the cam/helicoid ring 12 and the second lens group moving ring 17, respectively, in the above illustrated embodiment of the zoom lens barrel, it is obvious that the plurality of cam grooves and the corresponding plurality of cam followers can be formed on a ring member corresponding to the cam/helicoid ring 12 and another ring member corresponding to the second lens group moving ring 17, respectively.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A cam mechanism of a lens barrel, comprising:

a first ring member driven to rotate about an optical axis;

a second ring member which supports an optical element, and is linearly guided along said optical axis without rotating;

a plurality of cam grooves having the same cam diagrams which are formed on one of said first ring member and said second ring member; and a plurality of cam followers formed on the other of said first ring member and said second ring member to be engaged in said plurality of cam grooves, respectively, wherein at least two groove/follower groups, each of which includes a front groove/follower set and a rear groove/follower set which are positioned at different positions in said optical axis direction, are positioned at different positions in a circumferential direction, each of said front groove/follower set and said rear groove/follower set including a cam groove of said plurality of cam grooves and an associated cam follower of said plurality of cam followers, wherein said cam grooves of one of said two groove/follower groups intersect said cam grooves of another of said two groove/follower groups, respectively, and wherein at least one of the following two conditions (a) and (b) is satisfied:

(a) a distance in said optical axis direction between said front groove/follower set and said rear groove/follower set of one of said two groove/follower groups is different from a distance in said optical axis direction between said front groove/follower set and said rear groove/follower set of another of said two groove/follower groups, and (b) a distance in said circumferential direction between two said front groove/follower sets of said two groove/follower groups is different from a distance in said circumferential direction between two said rear groove/follower sets of said two groove/follower groups.

2. The cam mechanism according to claim 1, wherein said at least two groove/follower groups comprise at least three groove/follower groups which are positioned at intervals in said circumferential direction, and wherein each said cam grooves of one of said three groove/follower groups intersect all cam grooves of the remaining groups of said three groove/follower groups.

3. The cam mechanism according to claim 1, wherein at least one of the following two conditions (c) and (d) is satisfied:

(c) said front groove/follower sets of said three groove/follower groups are positioned at irregular intervals in said circumferential direction, and (d) said rear groove/follower sets of said three groove/follower groups are positioned at irregular intervals in said circumferential direction.

4. The cam mechanism according to claim 2, wherein a distance in said optical axis direction between said front groove/follower set and said rear groove/follower set of one of said three groove/follower groups is different from a distance in said optical axis direction between said front groove/follower set and said rear groove/follower set of another of said three groove/follower groups.

5. The cam mechanism according to claim 2, wherein said cam groove of said front groove/follower set and said cam groove of said rear groove/follower set are different in at least one of width and depth for at least one of said three groove/follower groups.

6. The cam mechanism according to claim 5, wherein the width relationship between said cam groove of said front groove/follower set and said cam groove of said rear groove/follower set of one of said three groove/follower groups is different from that between said cam groove of said front groove/follower set and said cam groove of said rear groove/follower set of another of said three groove/follower groups.

7. The cam mechanism according to claim 1, wherein two cam grooves of said plurality of cam grooves which are adjacent in the circumferential direction are different in at least one of width and depth.

8. The cam mechanism according to claim 1, wherein the sum of the number of said front groove/follower sets and the number of said rear groove/follower sets is six.

9. The cam mechanism according to claim 1, wherein said optical element comprises at least one lens group of a lens system provided in said lens barrel.

10. The cam mechanism according to claim 9, wherein said lens system comprises a zoom lens optical system.

11. The cam mechanism according to claim 1, wherein said first ring member is fitted on said second ring member to be positioned coaxial with said second ring member.

12. The cam mechanism according to claim 11, wherein said plurality of cam grooves are formed on an inner peripheral surface of said first ring member, and said plurality of cam followers are formed on an outer peripheral surface of said second ring member.

13. The cam mechanism according to claim 12, wherein said first ring member comprises another plurality of cam grooves formed on an outer peripheral surface of said first ring member.

14. The cam mechanism according to claim 1, wherein said first ring member comprises a spur gear which is formed on an outer peripheral surface of said first ring member in the vicinity of the rear end thereof to be engaged with a drive pinion.

15. The cam mechanism according to claim 14, wherein teeth of said spur gear are formed on the thread of a male helicoid formed on said outer peripheral surface of said first ring member.

16. The cam mechanism according to claim 15, wherein said lens barrel comprises a stationary barrel having a female helicoid formed on an inner peripheral surface of said stationary barrel, and wherein said male helicoid of said first ring member is engaged with said female helicoid of said stationary barrel.

17. The cam mechanism according to claim 1, wherein said first ring member rotates while moving along said optical axis when driven to rotate.

* * * * *